(12) United States Patent
Byun

(10) Patent No.: US 10,896,134 B2
(45) Date of Patent: Jan. 19, 2021

(54) INFORMATIVE VALUE IN INDEXING, CLASSIFYING, SEARCHING

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 5 days.

(21) Appl. No.: 16/233,731

(22) Filed: Dec. 27, 2018

(65) Prior Publication Data
US 2020/0065259 A1 Feb. 27, 2020

(30) Foreign Application Priority Data

Aug. 22, 2018 (KR) ........................ 10-2018-0098006

(51) Int. Cl.
*G06F 12/02* (2006.01)
*G06F 12/1009* (2016.01)
*G06F 3/06* (2006.01)

(52) U.S. Cl.
CPC .......... *G06F 12/1009* (2013.01); *G06F 3/064* (2013.01); *G06F 3/0679* (2013.01); *G06F 12/0246* (2013.01); *G06F 2212/7201* (2013.01); *G06F 2212/7211* (2013.01)

(58) Field of Classification Search
CPC ............... G06F 12/1009; G06F 3/0679; G06F 12/0246; G06F 3/064; G06F 2212/7211; G06F 2212/7201
See application file for complete search history.

(56) References Cited

U.S. PATENT DOCUMENTS

| 2015/0026389 | A1* | 1/2015 | Li ....................... G06F 12/0246 711/103 |
| 2017/0068621 | A1  | 3/2017 | Watanabe et al. |
| 2017/0109047 | A1* | 4/2017 | Lim ..................... G06F 3/0604 |
| 2018/0121121 | A1* | 5/2018 | Mehra .................. G06F 3/0604 |
| 2019/0108131 | A1* | 4/2019 | Lee ....................... G06F 3/0679 |

* cited by examiner

*Primary Examiner* — Tasnima Matin
(74) *Attorney, Agent, or Firm* — IP & T Group LLP

(57) ABSTRACT

A data processing system comprises a host that includes a first memory; and a memory system that includes a controller having a second memory, and a memory device, wherein the controller: checks whether a first mapping table whose mapping information is changed exists or not in a first list, checks whether a memory block corresponding to a piece of map data included in the first mapping table exists or not in a second list, and decides that the first mapping table is to be shortly updated due to an internal operation and does not transfer the first mapping table to the host when the memory block corresponding to the map data included in the first mapping table exists in the second list.

20 Claims, 15 Drawing Sheets

FIG. 9

| i | memory mapping table change list | |
|---|---|---|
| 1 | 1st NAND Mapping Table | ~NMT_C |
| 2 | 2nd NAND Mapping Table | ~NMT_1 |
| ⋮ | ⋮ | ~NMT_2 |
| i | Nth NAND Mapping Table | ~NMT_3 |

FIG. 10

| 1st memory Mapping Table(NMT_1) | |
|---|---|
| LA | PA |
| 0 | 305 |
| 1 | 101→900 |
| 2 | 102 |
| 3 | 103 |
| 4 | 196→905 |

| 2nd memory Mapping Table(NMT_2) | |
|---|---|
| LA | PA |
| 5 | 10 |
| 6 | 14→50 |
| 7 | 203 |
| 8 | 204 |
| 9 | 205 |

| j | Candidate Block List | ~CBL |
|---|---|---|
| 1 | 1st Block | |
| 2 | 7th Block | |
| 3 | 8th Block | |

INFORMATIVE VALUE IN INDEXING, CLASSIFYING, SEARCHING

CROSS-REFERENCE TO RELATED APPLICATIONS

This application claims priority under 35 U.S.C. § 119(a) to Korean Patent Application No. 10-2018-0098006, filed on Aug. 22, 2018, which is incorporated herein by reference in its entirety.

BACKGROUND

1. Field

Exemplary embodiments of the present invention relate to a data processing system, and more particularly, to a data processing system for processing a mapping table between a host and a memory system, and a method for operating the data processing system.

2. Description of the Related Art

Recently, the paradigm for the computer environment has shifted to ubiquitous computing systems that can be used anytime and anywhere. Due to this fact, the use of portable electronic devices such as mobile phones, digital cameras, and notebook computers has rapidly increased. In general, such portable electronic devices use a memory system which uses a memory device, that is, a data storage device. The data storage device is used as a main memory device or an auxiliary memory device of the portable electronic devices.

A data storage device using a memory device provides advantages in that, since there is no mechanical driving part, stability and durability are excellent, an information access speed is high and power consumption is small. Data storage devices having such advantages include a universal serial bus (USB) memory device, memory cards having various interfaces, and a solid-state drive (SSD).

SUMMARY

Embodiments of the present invention are directed to a data processing system and a method for operating the data processing system exhibiting reduced complexity and performance deterioration, and increased utility efficiency of a memory device of the data processing system. The data processing system and the method for operating the data processing system can rapidly and stably process data into the memory device.

In accordance with an embodiment of the present invention, a method for operating a data processing system provided with a host including a first memory, a memory device, and a controller including a second memory, the method comprises: checking, by the controller, whether a first mapping table whose mapping information is changed exists or not in a first list and then checking, by the controller, whether the first mapping table exists or not in the second memory; checking, by the controller, whether a memory block corresponding to a piece of map data included in the first mapping table exists or not in a second list, when the first mapping table exists in the second memory; deciding, by the controller, that the first mapping table is to be shortly updated due to an internal operation and returning to the checking, when the memory block corresponding to the map data exists in the second list; transferring, by the controller, the first mapping table to the host, when any memory block corresponding to any piece of map data does not exist in the second list; and receiving, by the host, the first mapping table from the controller and updating, by the host, a second mapping table included in the first memory and corresponding to the first mapping table.

In accordance with yet another embodiment of the present invention, a data processing system, comprising: a host that includes a first memory; and a memory system that includes a controller having a second memory, and a memory device, wherein the controller: checks whether a first mapping table whose mapping information is changed exists or not in a first list, checks whether a memory block corresponding to a piece of map data included in the first mapping table exists or not in a second list, and decides that the first mapping table is to be shortly updated due to an internal operation and does not transfer the first mapping table to the host when the memory block corresponding to the map data included in the first mapping table exists in the second list.

In accordance with yet another embodiment of the present invention, a memory system comprises: at least one processor; and at least one memory device including a program command, wherein the program command configured to cause the memory system to: check whether a first mapping table whose mapping information is changed exists or not in a first list; check whether the first mapping table exists or not in a second memory when the first mapping table whose mapping information is changed exists in the first list; check, when the first mapping table exists in the second memory, whether a memory block corresponding to a piece of map data included in the first mapping table exists or not in a second list; decide, when a memory block corresponding to the at least one map data included in the first mapping table exists in the second list, that the first mapping table is to be shortly updated due to an internal operation and does not transfer the first mapping table to the host; and when a memory block corresponding to the at least one map data included in the first mapping table does not exist in the second list, provide entry information of the first mapping table along with a response to a host, and transfer the first mapping table to the host in response to a read buffer command requesting the first mapping table from the host.

In accordance with another embodiment of the present invention, an operating method of a controller, the method comprises: updating a first mapping table, which includes plural pieces of map information, due to an operation of a memory device controlled by the controller; and providing an external device, which keeps a second mapping table, with the updated first mapping table for synchronization between the first and second mapping table unless the updated first mapping table is to be shortly updated again, wherein the map information represents mapping relationship between a virtual memory address known to the external device and a substantial memory address of the memory device.

These and other features and advantages of the present invention will become apparent to those skilled in the art of the invention from the following detailed description in conjunction with the following drawings.

BRIEF DESCRIPTION OF THE DRAWINGS

FIG. 9 is a diagram illustrating a NAND mapping information change list in accordance with an embodiment of the present invention.

FIG. 10 is a diagram exemplarily illustrating a plurality of memory mapping tables in accordance with an embodiment of the present invention.

DETAILED DESCRIPTION

Figure 1:
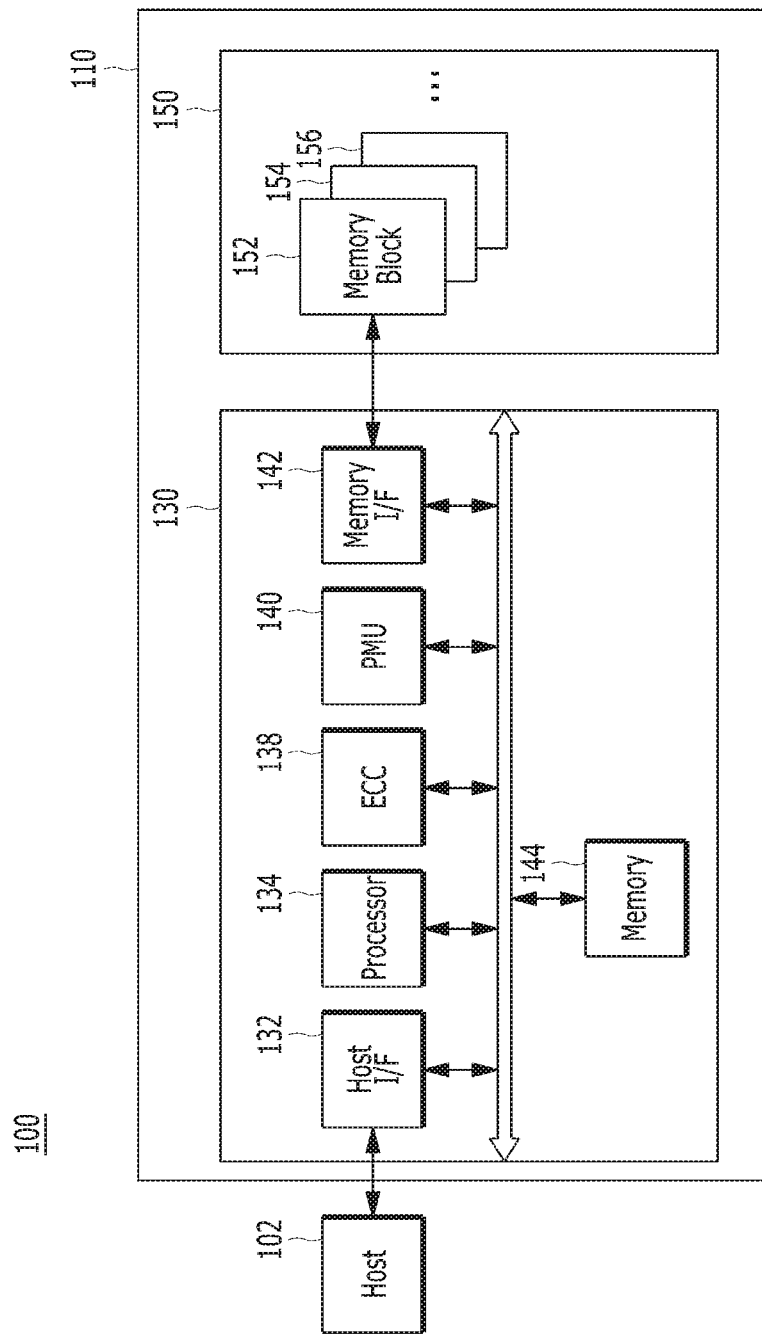
FIG. 1 is a block diagram exemplarily illustrating a data processing system including a memory system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It is noted that reference to "an embodiment" does not necessarily mean only one embodiment, and different references to "an embodiment" are not necessarily to the same embodiment(s).

It will be understood that, although the terms "first" and/or "second" may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof.

The above-described exemplary embodiments are merely for the purpose of understanding the technical spirit of the present disclosure and the scope of the present disclosure should not be limited to the above-described exemplary embodiments. It will be obvious to those skilled in the art to which the present disclosure pertains that other modifications based on the technical spirit of the present disclosure may be made in addition to the above-described exemplary embodiments.

Unless otherwise defined, all terms including technical and scientific terms used herein have the same meaning as commonly understood by one of ordinary skill in the art to which the present disclosure belongs. Unless otherwise defined in the present disclosure, the terms should not be construed as being ideal or excessively formal.

Hereinafter, the various embodiments of the present invention will be described in detail with reference to the attached drawings.

FIG. 1 is a block diagram exemplarily illustrating a data processing system including a memory system in accordance with an embodiment of the present invention.

Referring to FIG. 1, the data processing system 100 may include a host 102 operatively coupled to a memory system 110. The host 102 may include various portable electronic devices such as a mobile phone, MP3 player and laptop computer, or any of various non-portable electronic devices, such as a desktop computer, a game player, TV, and a projector.

The host 102 may include at least one operating system (OS), which may manage and control overall functions and operations of the host 102, and provide operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix.

Furthermore, the mobile OS configured to support a function of providing a mobile service to users and a power saving function of a system may include Android, iOS and Windows Mobile. The host 102 may include a plurality of OSs, and execute an OS to perform an operation corresponding to a user's request on the memory system 110.

The memory system 110 may operate to store data for the host 102 in response to a request of the host 102. Non-limiting examples of the memory system 110 may include a solid-state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and a memory stick. The MMC may include an embedded MMC (eMMC), reduced size MMC (RS-MMC) and micro-MMC, and the like. The SD card may include a mini-SD card and micro-SD card.

The memory system 110 may be embodied by various types of storage devices. Examples of such storage devices may include, but are not limited to, volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a memory device 150 and a controller 130. The memory device 150 may store data for the host 102, and the controller 130 may control data storage into the memory device 150.

The controller 130 and the memory device 150 may be integrated into a single semiconductor device, which may be included in the various types of memory systems as exemplified above. For example, the controller 130 and the memory device 150 may be integrated as one semiconductor device to constitute an SSD. When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a PCMCIA (personal computer memory card international association) card, CF card, SMC (smart media card), memory stick, MMC including RS-MMC and micro-MMC, SD card including mini-SD, micro-SD and SDHC, or UFS device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even when power is not supplied or interrupted. The memory device 150 may store data provided from the host 102 through a write operation, and provide data stored therein to the host 102 through a read operation. The memory device 150 may include a plurality of memory blocks 152, 154 and 156 each of which may include a plurality of pages, and each of the pages may include a plurality of memory cells coupled to a word line. Also, the memory device 150 may include a plurality of planes each of which includes a plurality of memory blocks 152, 154 and 156, and particularly, the memory device 150 may include a plurality of memory dies each of which includes a plurality of planes. In an embodiment, the memory device 150 may be a flash memory. The flash memory may have a 3-dimensional (3D) stack structure.

Herein, the structure of the memory device 150 and the 3D stack structure of the memory device 150 will be described in detail later with reference to FIGS. 2 to 4.

The controller 130 may control the memory device 150 in response to a request from the host 102. For example, the controller 130 may provide data read from the memory device 150 to the host 102, and store data provided from the host 102 into the memory device 150. For this operation, the controller 130 may control the operations of the memory device 150, such as a read operation, a write operation, a program operation and an erase operation.

To be specific, the controller 130 may include a host interface (I/F) 132, a processor 134, an error correction code (ECC) unit 138, a Power Management Unit (PMU) 140, a memory I/F 142, and a memory 144.

The host interface 132 may be configured to process a command and data of the host 102, and may communicate with the host 102 through one or more of various interface protocols such as universal serial bus (USB), multi-media card (MMC), peripheral component interconnect-express (PCI-e or PCIe), serial-attached SCSI (SAS), serial advanced technology attachment (SATA), parallel advanced technology attachment (PATA), small computer system interface (SCSI), enhanced small disk interface (ESDI), integrated drive electronics (IDE), and Mobile Industry Processor Interface (MIPI). Herein, the host interface 132 may be a region that transfers and receives data to and from the host 102, and the host interface 132 may operate based on firmware which is referred to as a Host Interface Layer (HIL).

Also, the ECC unit 138 may detect and correct an error bit of a data processed in the memory device 150, and the ECC unit 138 may include an ECC encoder and an ECC decoder. Herein, the ECC encoder may perform an error correction encoding onto the data to be programmed into the memory device 150 to generate a data to which a parity bit is added. The data including the parity bit added thereto may be stored in the memory device 150. When a data stored in the memory device 150 is read out, the ECC decoder may detect and correct an error included in the data read from the memory device 150. In other words, the ECC unit 138 may perform an error correction decoding process onto the data read from the memory device 150, and then decide whether the error correction decoding process is successful or not, output an indication signal, e.g., an error correction success signal or an error correction failure signal, based on the decision result, and correct an error bit of the read data by using the parity bit generated during the ECC encoding process. Herein, when the number of error bits is more than a threshold value of correctable error bits, the ECC unit 138 may not correct the error bits and may output an error correction failure signal corresponding to the failure of the correction of the error bits.

The ECC unit 138 may perform error correction through a coded modulation, such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited to any specific structure. The ECC unit 138 may include all circuits, modules, systems or devices for error correction.

The PMU 140 may provide and manage power of the controller 130, i.e., power of the constituent elements included in the controller 130.

The memory I/F 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory I/F 142 may generate a control signal for the memory device 150 and process data under the control of the processor 134. The memory I/F 142 may serve as an interface (e.g., a NAND flash interface) for processing a command and data between the controller 130 and the memory device 150. Specifically, the memory I/F 142 may support data transfer between the controller 130 and the memory device 150, and the memory I/F 142 may be a region where it transfers and receives data to and from the memory device 150, and may be driven by a firmware which may be referred to as a Flash Interface Layer (FIL).

The memory 144 may serve as a working memory of the memory system 110 and the controller 130, and store data for driving the memory system 110 and the controller 130. To be specific, the memory 144 of the controller 130 may control the memory device 150 in response to a request from the host 102. For example, the controller 130 may provide data read from the memory device 150 to the host 102 and store data provided from the host 102 into the memory device 150. When the controller 130 controls the operation of the memory device 150 to perform read, write, program and erase operations for such operations, the controller 130 may store data required to perform the operations in the memory system 110, i.e., between the controller 130 and the memory device 150.

The memory 144 may be embodied as a volatile memory. For example, the memory 144 may be embodied by static random access memory (SRAM) or dynamic random access memory (DRAM). Also, the memory 144 may be disposed in the inside of the controller 130 as illustrated in FIG. 1, or the memory 144 may be disposed out of the controller 130. According to another embodiment of the present invention, the memory 144 may be realized as an external volatile memory that transfers and receives data to and from the controller 130 through a memory interface.

Also, the memory 144 may store data required for performing operations such as a data write operation and a data read operation between the host 102 and the memory device 150, and data produced when the data write operation and the data read operation are performed. To store the data, the memory 144 may include a program memory, a data memory, a write buffer/cache, a read buffer/cache, a data buffer/cache, a map buffer/cache, and the like.

The processor 134 may control the overall operations of the memory system 110. Particularly, the processor 134 may control a program operation or a read operation performed onto the memory device 150 in response to a write request or a read request transferred from the host 102. Herein, the processor 134 may drive a firmware which may be referred to as a Flash Translation Layer (FTL) to control the overall operations of the memory system 110. Also, the processor 134 may be realized as a microprocessor or a Central Processing Unit (CPU).

For example, the controller 130 may perform an operation requested by the host 102 in the memory device 150 through the processor 134, which is realized as a microprocessor or a CPU. In other words, the controller 130 may perform a command operation corresponding to a command received from the host 102, or source other than the host 102. The controller 130 may perform a foreground operation as the command operation corresponding to the command received from the host 102. For example, the controller 130 may perform a program operation corresponding to a write command, a read operation corresponding to a read command, an erase operation corresponding to an erase command, and a parameter set operation corresponding to a set parameter command or a set feature command.

Also, the controller 130 may perform a background operation onto the memory device 150 through the processor 134, which is realized as a microprocessor or a CPU. The background operation performed onto the memory device 150 may include an operation of copying and processing data stored in some memory blocks among the memory blocks 152, 154 and 156 of the memory device 150 into other memory blocks, e.g., a garbage collection (GC) operation, a swapping operation between the memory blocks 152, 154 and 156 or between the data of the data of the memory blocks 152, 154 and 156, e.g., a wear-leveling (WL) operation, an operation of storing map data stored in the controller 130 in the memory blocks 152, 154 and 156, e.g., a map flush operation, or an operation of managing bad blocks of the memory device 150, e.g., a bad block management operation of detecting and processing bad blocks among the memory blocks 152, 154 and 156 included in the memory device 150.

In addition, the processor 134 of the controller 130 may include a management unit (not shown) for performing bad block management of the memory device 150, and the management unit may detect a bad block among the memory blocks 152, 154 and 156 included in the memory device 150 and perform a bad block management of processing the detected bad block as a bad block. Herein, according to the bad block management, when the memory device 150 is a flash memory, e.g., a NAND flash memory, a program failure may occur during a data program operation, i.e., a data write operation, due to the characteristics of NAND, and the memory block in which the program failure occurs may be treated as a bad memory block, and the data which has failed to be programmed may be written, or programmed, into a new memory block. Also, as illustrated, when the memory device 150 has a 3D stack structure and a memory block is treated as a bad memory block due to a failure occurring in a program operation, the utility efficiency of the memory device 150 and the reliability of the memory system 110 [←100] drops sharply. Therefore, it is required to perform a bad block management more reliably.

Meanwhile, according to an embodiment of the present invention, there is provided a memory system including at least one storage device, which is interlocked with a host and includes at least one processor and program commands. For example, at least one storage device including at least one processor and program commands may be realized with the memory 144 and the processor 134 included in the controller 130. A memory device in the memory system in accordance with embodiments of the present disclosure is described below in detail with reference to FIGS. 2 to 6.

Figure 2:
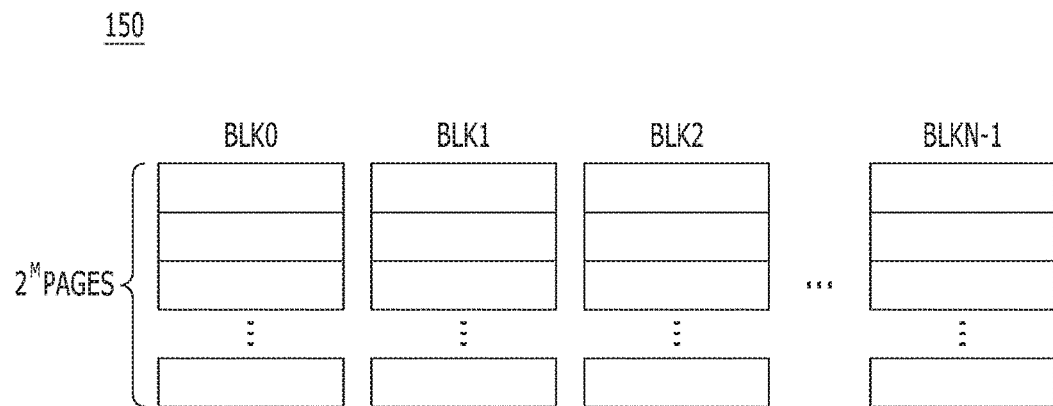
FIG. 2 is a schematic diagram illustrating an exemplary configuration of a memory device employed in the memory system shown in FIG. 1.
Figure 3:
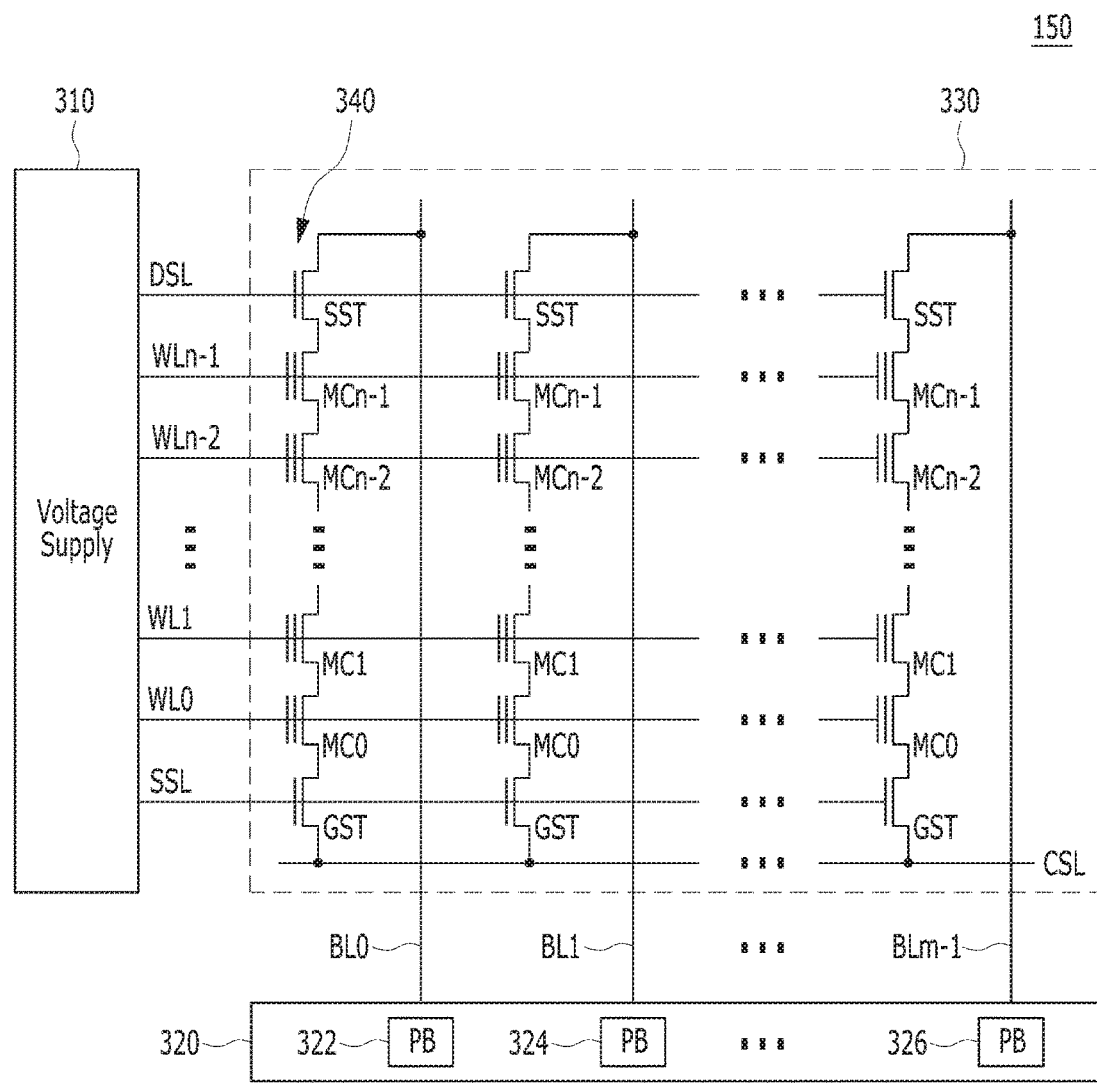
FIG. 3 is a circuit diagram illustrating an exemplary configuration of a memory cell array of a memory block in the memory device shown in FIG. 2.
Figure 4:
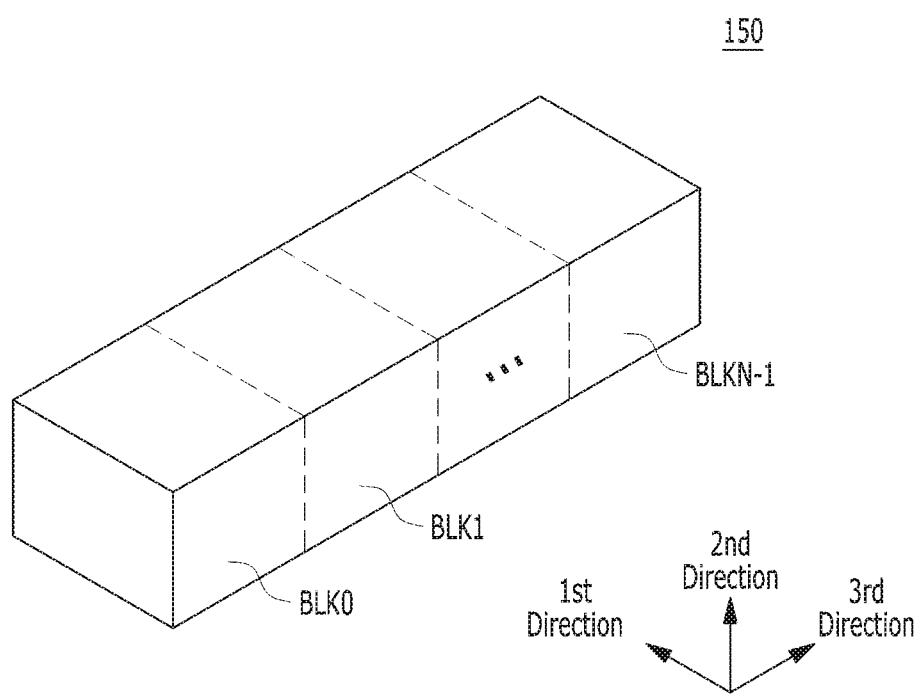
FIG. 4 is a schematic diagram illustrating an exemplary three-dimensional structure of the memory device shown in FIG. 2.

FIG. 2 is a diagram illustrating a memory device in a memory system, FIG. 3 is a diagram illustrating a memory cell array circuit of a memory block in a memory device, and FIG. 4 is a diagram illustrating a structure of a 3-dimensional nonvolatile memory device.

Referring to FIG. 2, the memory device 150 includes a plurality of memory blocks, for example, a zeroth block (BLOCK0) 210, a first block (BLOCK1) 220, a second block (BLOCK2) 230 and an (N−1)th block (BLOCKN−1) 240. Each of the blocks 210, 220, 230 and 240 includes a plurality of pages, for example, $2^M$ or M pages. Each of the pages includes a plurality of memory cells to which a plurality of word lines (WL) are coupled.

The memory device 150 may include single level cell (SLC) memory blocks and/or multi-level cell (MLC) memory blocks, depending on the number of bits to be stored in or expressed by one memory cell. An SLC memory block includes a plurality of pages which are realized by memory cells each storing 1 bit, and has high data calculation performance and high durability. An MLC memory block includes a plurality of pages which are realized by memory cells each storing multi-bit data (for example, 2 or more bits), and has a larger data storage space than the SLC memory block, that is, is capable of being highly integrated. In particular, the memory device 150 may include, as MLC memory blocks, an MLC memory block including a plurality of pages which are realized by memory cells each capable of storing 2-bit data, a triple level cell (TLC) memory block including a plurality of pages which are realized by memory cells each capable of storing 3-bit data, a quadruple level cell (QLC) memory block including a plurality of pages which are realized by memory cells each capable of storing 4-bit data, or a multiple level cell memory block including pages which are realized by memory cells each capable of storing 5 or more-bit data.

While it is described as an example that the memory device 150 is realized by a nonvolatile memory such as a flash memory, for example, a NAND flash memory, it is noted that the memory device 150 may be implemented as any of multiple types of memories such as a phase change memory (i.e., phase change random access memory (PCRAM)), a resistive memory (i.e., resistive random access memory (RRAM or ReRAM)), a ferroelectric memory (i.e., ferroelectric random access memory (FRAM)) and a spin transfer torque magnetic memory (i.e., spin transfer torque magnetic random access memory (STT-RAM or STT-MRAM)).

Each of the memory blocks 210, 220, 230 and 240 stores the data provided from the host 102 of FIG. 1, through a write operation, and provides stored data to the host 102, through a read operation.

Referring to FIG. 3, among the plurality of memory blocks 152, 154 and 156 in the memory device 150 of the memory system 110, each memory block 330 may include a plurality of cell strings 340 which are realized as a memory cell array and are coupled to bit lines BL0 to BLm−1, respectively. The cell string 340 of each column may include at least one drain select transistor DST and at least one source select transistor SST. A plurality of memory cells or memory cell transistors MC0 to MCn−1 may be coupled in series between the select transistors SST and DST. The respective memory cells MC0 to MCn−1 may be constructed by multi-level cells (MLC) each of which stores data or information of a plurality of bits. The cell strings 340 may be electrically coupled to corresponding bit lines BL0 to BLm−1, respectively.

While FIG. 3 shows, as an example, each memory block 330 constructed by NAND flash memory cells, it is noted that each of the plurality of memory blocks 152,154,156 is not limited to a NAND flash memory and may be realized by a NOR flash memory, a hybrid flash memory in which at least two kinds of memory cells are combined, or a one-NAND flash memory in which a controller is built in a memory chip. The memory device 150 may be realized as not only a flash memory device in which a charge storing layer is constructed by conductive floating gates but also a charge trap flash (CTF) memory device in which a charge storage layer is constructed by a dielectric layer.

A voltage supply circuit 310 of the memory device 150 may provide word line voltages (for example, a program voltage, a read voltage and a pass voltage) to be supplied to respective word lines according to an operation mode and voltages to be supplied to bulks (for example, well regions) formed with memory cells. The voltage generating operation of the voltage supply circuit 310 may be performed by the control of a control circuit (not shown). The voltage supply circuit 310 may generate a plurality of variable read voltages to generate a plurality of read data, select one of the memory blocks (or sectors) of a memory cell array in response to the control of the control circuit, select one of the word lines of the selected memory block, and provide the word line voltages to the selected word line and unselected word lines.

A read/write circuit 320 of the memory device 150 is controlled by a control circuit (not shown), and may operate as a sense amplifier or a write driver according to an operation mode. In a verify/normal read operation, the read/write circuit 320 may operate as a sense amplifier for reading data from the memory cell array. In a program operation, the read/write circuit 320 may operate as a write driver which drives bit lines according to data to be stored in the memory cell array. In the program operation, the read/write circuit 320 may receive data to be written in the memory cell array, from a buffer (not shown), and may drive the bit lines according to inputted data. To this end, the read/write circuit 320 may include a plurality of page buffers (PB) 322, 324 and 326 respectively corresponding to columns (or bit lines) or pairs of columns (or pairs of bit lines), and a plurality of latches (not shown) may be included in each of the page buffers 322, 324 and 326.

The memory device 150 may be realized as a 2-dimensional or 3-dimensional memory device. In particular, as shown in FIG. 4, the memory device 150 may be realized as a nonvolatile memory device with a three-dimensional stack structure. In the case where the memory device 150 is realized as a three-dimensional structure, the memory device 150 may include a plurality of memory blocks BLK0 to BLKN−1.

FIG. 4 illustrates the memory blocks 152, 154 and 156 of the memory device 150 shown in FIG. 1. Each of the memory blocks 152, 154 and 156 may be realized as a 3-dimensional structure (or a vertical structure). For example, the respective memory blocks 152, 154 and 156 may be realized as a 3-dimensional structure which extends in first to third directions, for example, the x-axis direction, the y-axis direction and the z-axis direction.

Each memory block 330 may include a plurality of NAND strings NS which extend in the second direction. The plurality of NAND strings NS may be provided in the first direction and the third direction. Each NAND string NS may be coupled to a bit line BL, at least one string select line SSL, at least one ground select line GSL, a plurality of word lines WL, at least one dummy word line DWL and a common source line CSL, and may include a plurality of transistor structures TS.

Namely, among the plurality of memory blocks 152, 154 and 156 of the memory device 150, each memory block 330 may be coupled to a plurality of bit lines BL, a plurality of string select lines SSL, a plurality of ground select lines GSL, a plurality of word lines WL, a plurality of dummy word lines DWL and a plurality of common source lines CSL, and accordingly, may include a plurality of NAND strings NS. Also, in each memory block 330, a plurality of NAND strings NS may be coupled to one-bit line BL, and a plurality of transistors may be realized in one NAND string NS. A string select transistor SST of each NAND string NS may be coupled to a corresponding bit line BL, and a ground select transistor GST of each NAND string NS may be coupled to the common source line CSL. Memory cells MC may be provided between the string select transistor SST and the ground select transistor GST of each NAND string NS. Namely, in the plurality of memory blocks 152, 154 and 156 of the memory device 150, a plurality of memory cells may be realized in each memory block 330.

Figure 5:
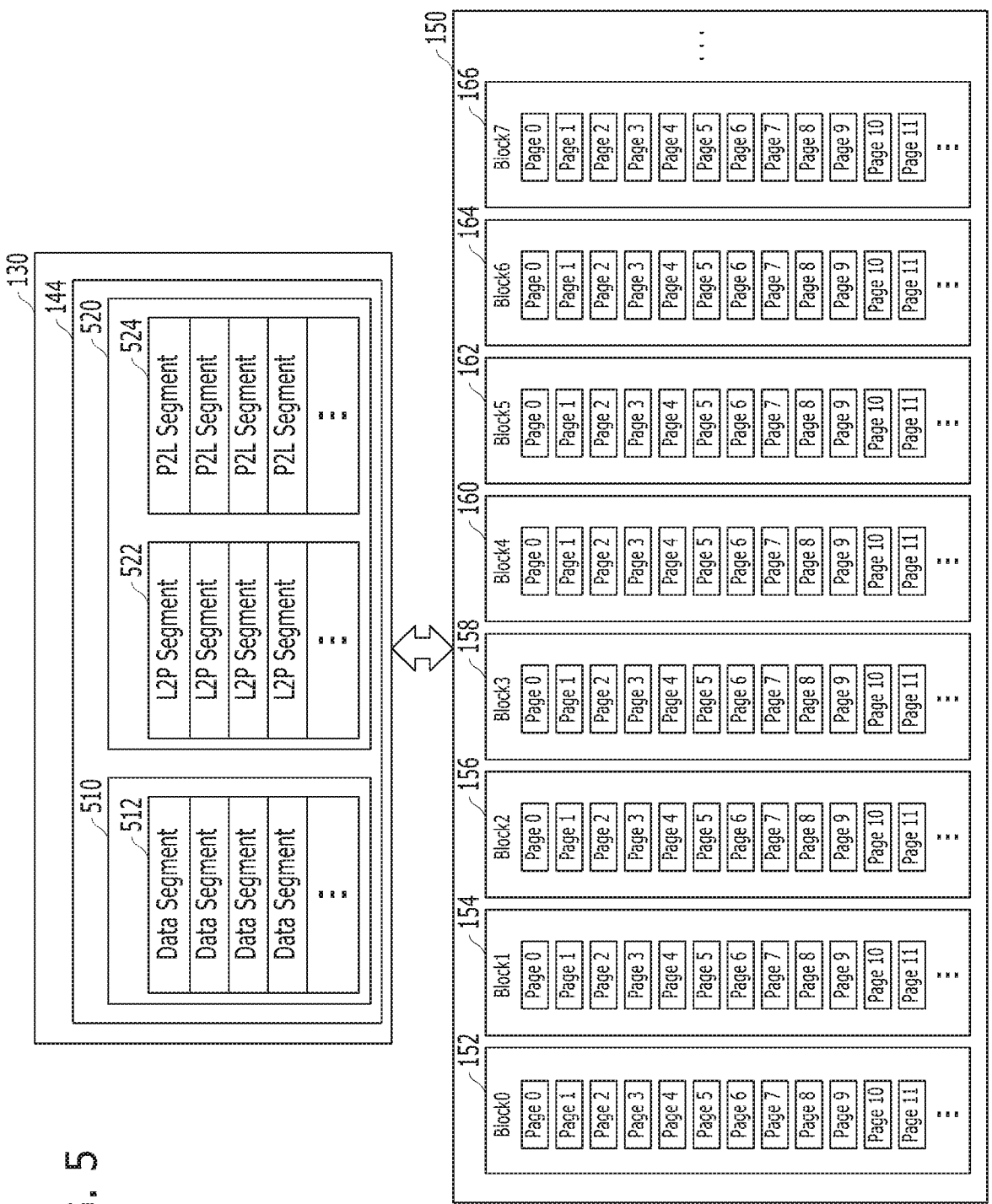
FIGS. 5 to 6 are exemplary diagrams illustrating a data processing operation in a memory system in accordance with an embodiment of the present invention.

FIG. 5 is a diagram illustrating a data processing operation with respect to a memory device in a memory system in accordance with an embodiment.

Referring to FIG. 5, the controller 130 performs a command operation corresponding to a command received from the host 102, for example, a program operation corresponding to a program command. The controller 130 programs and stores user data corresponding to the program command in the plurality of pages in memory blocks 152,154,156, 158,160,162,164 and 166 of the memory device 150.

The controller 130 generates and updates metadata for the user data, and programs and stores the metadata in the memory blocks 152,154,156,158,160,162,164 and 166 of the memory device 150. The metadata include logical to physical (logical/physical or L2P) information and physical to logical (physical/logical or P2L) information for the user data stored in the memory blocks 152,154,156,158,160,162, 164 and 166. Also, the metadata may include information on command data corresponding to a command received from the host 102, information on a command operation corresponding to the command, information on the memory blocks of the memory device 150 for which the command operation is to be performed, and information on map data corresponding to the command operation. In other words, metadata may include all information and data, excluding user data, corresponding to a command received from the host 102.

For example, the controller 130 caches and buffers user data corresponding to a program command received from the host 102, in a first buffer 510 of the controller 130. That is, the controller 130 stores data segments 512 of the user data in the first buffer 510 as a data buffer/cache. The first buffer 510 may be included in the memory 144 of the controller 130. Thereafter, the controller 130 programs and stores the data segments 512 stored in the first buffer 510, in the pages included in the memory blocks 152,154,156,158, 160,162,164 and 166 of the memory device 150.

As the data segments 512 of the user data are programmed and stored in the pages in the memory blocks 152,154,156, 158,160,162,164 and 166, the controller 130 generates L2P segments 522 and P2L segments 524 as metadata. Then, the controller 130 stores the L2P segments 522 and the P2L segments 524 in a second buffer 520 of the controller 130. The second buffer 520 may be included in the memory 144 of the controller 130. In the second buffer 520, the L2P segments 522 and the P2L segments 524 may be stored in the form of a list. Then, the controller 130 programs and stores the L2P segments 522 and the P2L segments 524 in the pages in the memory blocks 152,154,156,158,160,162, 164 and 166 through a map flush operation.

The controller 130 performs a command operation corresponding to a command received from the host 102. For example, the controller 130 performs a read operation corresponding to a read command. The controller 130 checks L2P segments 522 and P2L segments 524 of user data corresponding to the read command by loading them in the second buffer 520. Then, the controller 130 reads data segments 512 of the user data from a storage position known through the checking. That is, the controller 130 reads the data segments 512 from a specific page of a specific memory block among the memory blocks 152,154,156,158,160,162, 164 and 166. Then, the controller 130 stores the data segments 512 in the first buffer 510, and provides the data segments 512 to the host 102.

Figure 6:
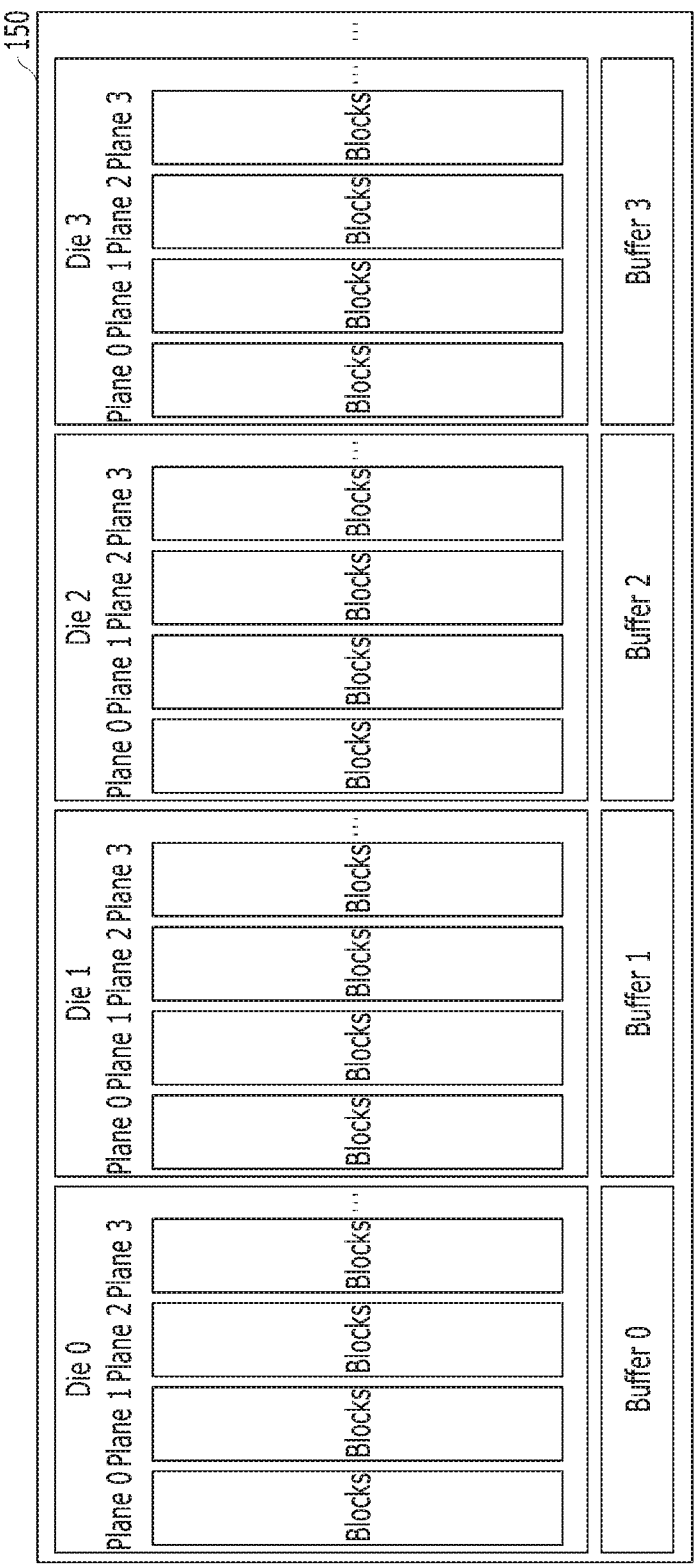

Referring to FIG. 6, the memory device 150 may include a plurality of memory dies, for example, a memory die 0 (denoted as "Die 0"), a memory die 1 (denoted as "Die 1"), a memory die 2 (denoted as "Die 2"), and a memory die 3 (denoted as "Die 3"). Each of the memory dies may include a plurality of planes, for example, a plane 0 (denoted as "Plane 0"), a plane 1 (denoted as "Plane 1"), a plane 2 (denoted as "Plane 2"), and a plane 3 (denoted as "Plane 3"). The respective planes in the memory dies included in the memory device 150 may include a plurality of memory blocks, for example, N number of blocks Block0, Block1, . . . , BlockN−1 each including a plurality of pages, for example, 2^M number of pages, as described above with reference to FIG. 2. Moreover, the memory device 150 may include a plurality of buffers corresponding to the respective memory dies, for example, a buffer 0 (denoted as "Buffer 0") corresponding to the memory die 0, a buffer 1 (denoted as "Buffer 1") corresponding to the memory die 1, a buffer 2 (denoted as "Buffer 2") corresponding to the memory die 2, and a buffer 3 (denoted as "Buffer 3") corresponding to the memory die 3.

When performing command operations corresponding to a plurality of commands received from the host 102, data corresponding to the command operations may be stored in the buffers included in the memory device 150. For example, when performing program operations, data corresponding to the program operations may be stored in the buffers, and may then be stored in the pages included in the memory blocks of the memory dies. When performing read operations, data corresponding to the read operations may be read from the pages included in the memory blocks of the memory dies, may be stored in the buffers, and may then be provided to the host 102 through the controller 130.

Although FIG. 6 shows, as an example and for illustrative purposes, that the buffers included in the memory device 150 exist outside the respective corresponding memory dies, the present invention is not limited thereto. That is, the buffers may exist inside the respective corresponding memory dies. It is to be noted that the buffers may correspond to the respective planes or the respective memory blocks in the respective memory dies. Further, in the embodiment of the present disclosure, although it is described throughout this specification, as an example for the sake of convenience in explanation, that the buffers included in the memory device 150 may correspond to the plurality of page buffers 322, 324 and 326 included in the memory device 150 as described above with reference to FIG. 3, it is to be noted that the buffers may be a plurality of caches or a plurality of registers included in the memory device 150.

Also, the plurality of memory blocks included in the memory device 150 may be grouped into a plurality of super memory blocks (not shown), and command operations may be performed in the plurality of super memory blocks. Each of the super memory blocks may include a plurality of memory blocks, for example, memory blocks included in a first memory block group and a second memory block group. In this regard, in the case where the first memory block group is included in the first plane of a certain first memory die, the second memory block group may be included in the first plane of the first memory die, be included in the second plane of the first memory die or be included in the planes of a second memory die.

Hereinbelow, detailed descriptions will be made through an example with reference to FIGS. 7 to 9 for performing of program operations corresponding to a plurality of write commands received from the host 102 and read operations corresponding to a plurality of read commands received from the host 102, in the plurality of memory dies included in the memory device 150, and for performing of a map update operation and a map flush operation in correspondence to performing of the program operations and the read operations, as described above, in the memory system in accordance with the embodiment of the present disclosure.

Figure 7:
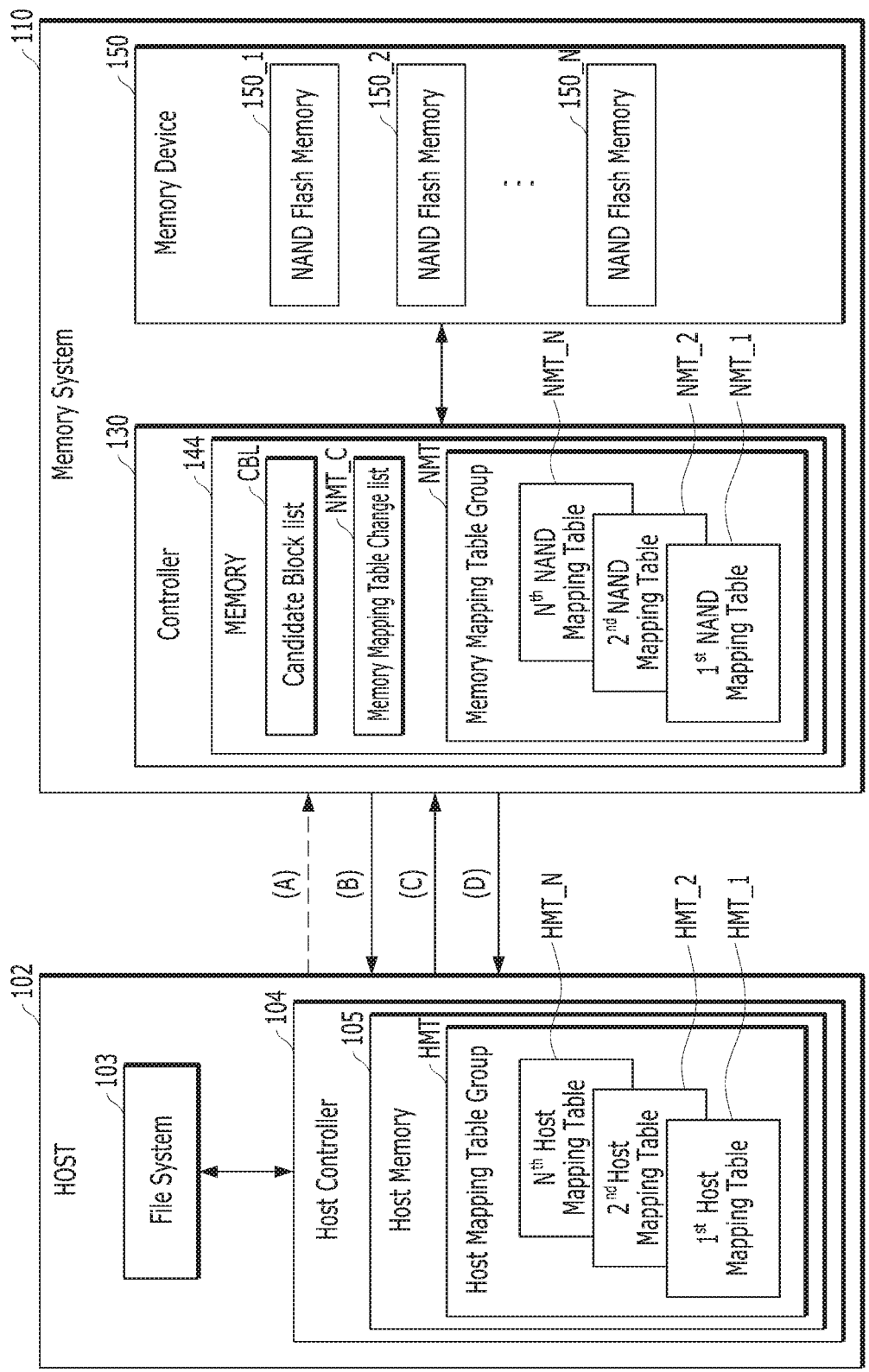
FIG. 7 is a block diagram illustrating a synchronization scheme of a data processing system in accordance with an embodiment of the present invention.

FIG. 7 is a block diagram illustrating a synchronization scheme of the data processing system 100 in accordance with an embodiment of the present invention.

The memory system 110 may perform an erase operation on the basis of a memory block while performing a write operation and a read operation on the basis of a page due to the physical structure of a flash memory. The memory system 110 may include a Flash Translation Layer (FTL) in the controller 130 to support the file system, and may perform a command operation or an internal operation through the FTL. That is, the controller 130 may control a plurality of NAND flash memories 150_1 to 150_N included in the memory device 150 according to a command received from the host 102, and may also perform internal operations, such as a garbage collection operation, a read reclaim operation, and a wear leveling operation. In other words, the controller 130 may perform the above operations by executing the FTL which is realized as software.

Herein, the command operation and the internal operation may be performed as the FTL performs an address mapping operation of converting a logical address (LA) provided by the host 102 into a physical address (PA) of the memory system 110. However, when the memory system 110 performs the address mapping operation by using the FTL, the mapping information between the logical address LA provided by the host 102 and the physical address PA of the memory system 110, i.e., a mapping table storing map data, which will be, hereinafter, referred to as a memory mapping table NMT.

As the memory system 110 becomes larger in capacity, the size of the memory mapping table NMT may be increased inevitably. As a result, since the time for the memory system 110 to search the memory mapping table NMT increases, the operation speed of the memory system 110 may be decreased.

In order to solve the problem, the memory system 110 may include a plurality of memory mapping tables NMT while the host may include a plurality of host mapping tables HMT. The data processing system 100 may preferentially perform an address mapping operation in the host 102 by synchronizing the memory mapping tables NMT and the host mapping tables HMT with each other. Such synchronization operation may be referred to as a host performance booster (HPB) operation.

FIG. 7 shows the data processing system 100 for performing the synchronization operation between the host mapping tables HMT included in the host 102 and the memory mapping table NMT included in the memory system 110.

The data processing system 100 in accordance with the embodiment of the present invention may include the host 102 and the memory system 110.

The host 102 may include a file system 103 and a host controller 104 that receives a command from the file system 103 and provides the command to the memory system 110.

The host controller 104 may include a host memory 105 having a host mapping table group HMT stored therein.

The host mapping table group HMT may include a first host mapping table HMT_1 to an $N^{th}$ host mapping table HMT_N.

The host 102 may transfer one or more requests to the controller 130 (denoted as "(A)" in FIG. 7).

The memory system 110 may include the memory device 150 including a plurality of NAND flash memories 150_1 to 150_N and the controller 130 for controlling the memory device 150.

The controller 130 may include a memory having a memory mapping table group NMT, a candidate block list CBL, and a NAND mapping information change list stored therein.

The memory mapping table group NMT may include a first memory mapping table NMT_1 to an $N^{th}$ memory mapping table NMT_N.

Herein, the host interface 132, the processor 134, the ECC unit 138, the power management unit 140, and the memory interface 140, which are shown as being included in the controller 130 of FIG. 1, are illustrated as not being included in the controller 130 of FIG. 7. However, this is omitted from the drawing for the sake of convenience in explanation only, and they may be actually included in the controller 130.

For the synchronization operation, the controller 130 may provide the host 102 with entry information of an updated memory mapping table NMT along with a response (denoted as "(B)" in FIG. 7) to the request ("(A)") received from the host 102. In other words, the controller 130 may provide the host 102, along with the response ("(B)") to the request ("(A)") of the host 102, with memory mapping table update information indicating that the memory mapping table NMT is updated due to a command operation or an internal operation and thus the synchronization operation is required to be performed.

The memory mapping table update information may include a memory mapping table index, and type information and size information of map data and the like. In the embodiment of the present invention, the entry information of the memory mapping table may include the memory mapping table index.

The host 102 may check the response message including index of the updated memory mapping table received from the controller 130 and transfer a read buffer command (denoted as "(C)" in FIG. 7) for reading the updated memory mapping table to the controller 130.

The controller 130 may transfer a memory mapping table (denoted as "(D)" in FIG. 7) including one or more map data (i.e., L2P information) in response to the read buffer command received from the host 102.

The host 102 may update, through the synchronization operation, the host mapping table HMT based on the updated memory mapping table NMT transferred from the controller 130.

The data processing system 100 may reduce the burden of searching the memory mapping table NMT within the memory system 110 by synchronizing the memory mapping table NMT of the memory system 110 with the host mapping table HMT of the host 102, which may lead to improvement in the operation performance of the memory system 110 and the operation performance of the host 102.

Herein, before the controller 130 transfers the updated memory mapping table NMT to the host 102, it is decided whether to perform a synchronization operation or not depending on whether the updated memory mapping table NMT originating from an internal operation is shortly to be updated again or not. In other words, the controller 130 may select candidate memory blocks the map data of which is to be changed due to a shortly upcoming internal operation, check whether there is L2P information corresponding to the candidate blocks or not among L2P information included in the updated memory mapping table NMT, and decide whether to provide the memory mapping table NMT to the host 102 for the synchronization operation. This will be described specifically in the following embodiments of the present invention based on the HPB operation with reference to FIGS. 8 to 14.

Figure 8:
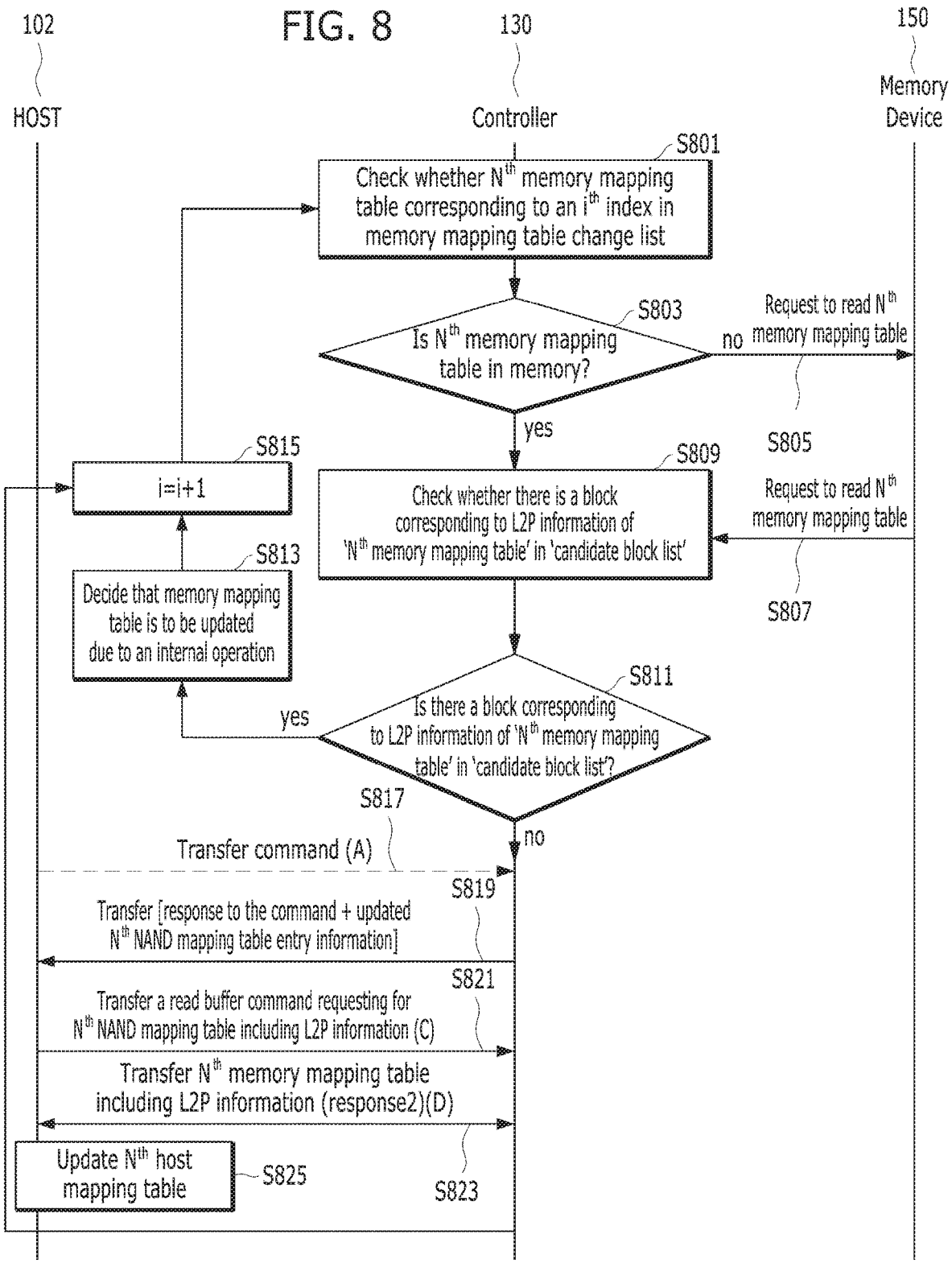
FIG. 8 is a flowchart exemplarily describing a method for performing a synchronization operation of a data processing system in accordance with an embodiment of the present invention.

FIG. 8 is a flowchart exemplarily describing a method for operating the data processing system to synchronize the host mapping tables HMT of the host 102 and the memory mapping tables NMT of the memory system 110 in accordance with an embodiment of the present invention.

FIG. 9 exemplarily illustrates a memory mapping table change list in accordance with an embodiment of the present invention.

FIG. 10 exemplarily illustrates a plurality of memory mapping tables NMT in accordance with an embodiment of the present invention.

Figures 11, 12:
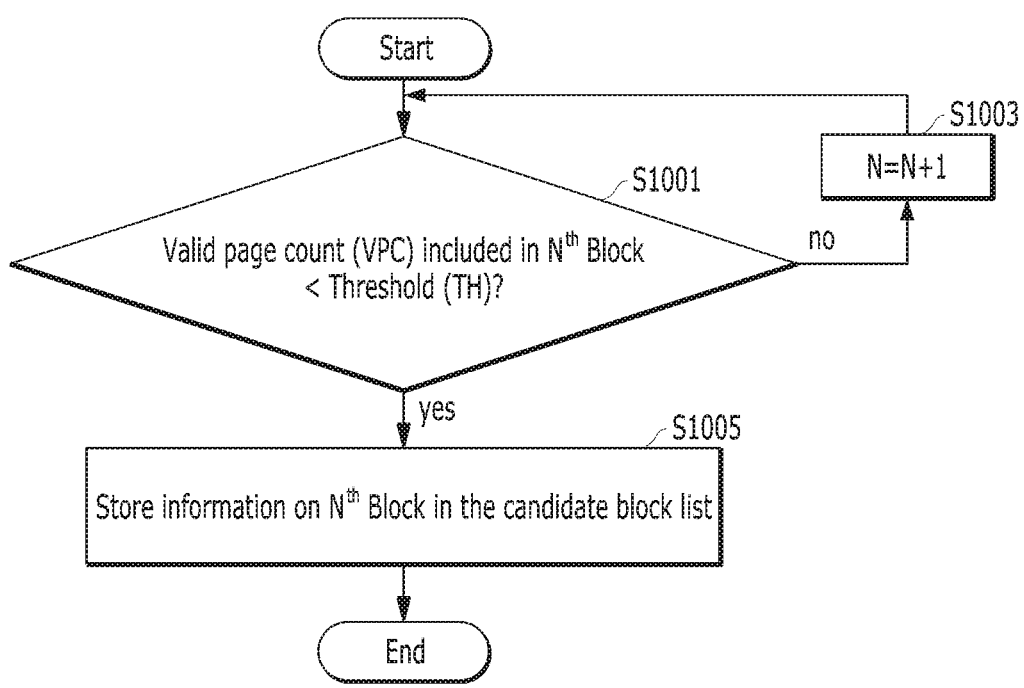
FIG. 11 is a diagram exemplarily illustrating a candidate block list (CBL) in accordance with an embodiment of the present invention.
FIGS. 12 to 14 are flowcharts exemplarily describing a method for forming a candidate block list (CBL) in accordance with an embodiment of the present invention.

FIG. 11 exemplarily illustrates a candidate block list (CBL) in accordance with an embodiment of the present invention.

Referring to FIG. 8, in step S801, the controller 130 may check the $N^{th}$ memory mapping table NMT_N corresponding to an $i^{th}$ index in the memory mapping table change list. Referring to FIG. 9, the memory mapping table change list may be a table storing entry information of the memory mapping table NMT in which the L2P information is updated within the memory mapping table group NMT. The first field in the memory mapping table change list may indicate an index, and the second field may indicate the entry information of the memory mapping table whose LP2 information is updated.

The controller 130 may update the L2P information included in the memory mapping table NMT whenever a command operation corresponding to a write command, a read command, or an erase command received from the host 102 is performed or an internal operation such as a garbage collection operation, a read reclaim operation, or a wear leveling operation is performed. As described above, when the L2P information is updated, the controller 130 may store entry information of the memory mapping table including the updated L2P information in the memory mapping table change list.

For example, referring to FIG. 10, the memory 144 may include a first memory mapping table NMT_1 and a second memory mapping table NMT_2. The first memory mapping table NMT_1 and the second memory mapping table NMT_2 may include one or more L2P information for managing data stored in the memory device 150. In the first memory mapping table NMT_1 and the second memory mapping table NMT_2, the first fields may indicate logical addresses, and the second fields may indicate physical addresses or chunk addresses. The first memory mapping table NMT_1 may be allocated to logical addresses LA 0, 1, 2, 3 and 4, and corresponding physical addresses PA 305, 101, 102, 103 and 196. The second memory mapping table NMT_2 may be allocated to logical addresses LA 5, 6, 7, 8 and 9, and corresponding physical addresses PA 10, 14, 203, 204 and 205.

Within the first memory mapping table NMT_1, the physical address 101 mapped to the logical address 1 is exemplified to be changed to physical address 900 and the physical address 196 mapped to the logical address 4 is exemplified to be changed to physical address 905, due to a command operation or an internal operation. Within the second memory mapping table NMT_2, the physical address 14 mapped to the logical address 6 is exemplified to be changed to physical address 50 due to a command operation or an internal operation. In this manner, the controller 130 may sequentially store the updated first memory mapping table NMT_1 and the updated second memory mapping table NMT_2 in the memory mapping table change list.

Referring back to FIG. 8, in step S803, it is decided whether the $N^{th}$ memory mapping table NMT_N is stored in the memory 144.

When it turns out in the step S803 that the $N^{th}$ memory mapping table NMT_N is not store in the memory ("NO"), the controller 130 may transfer a request for reading the $N^{th}$ memory mapping table NMT_N from the memory device 150, load onto the memory 144 the $N^{th}$ memory mapping table NMT_N from the NAND flash memory, and perform the operation of the step S809, which will be described below.

On the other hand, when it turns out in the step S803 that the $N^{th}$ memory mapping table NMT_N is present in the memory ("YES"), in step S809, the controller 130 may decide whether any piece of L2P information among the L2P information within the $N^{th}$ memory mapping table NMT_N corresponds to any memory block listed in the candidate block list CBL.

Referring to FIG. 11, the candidate block list CBL may be a list of memory blocks onto which an internal operation is to be shortly performed. The internal operation may be any one among a garbage collection operation, a read reclaim operation and a wear leveling operation. For example, the candidate block list CBL may include a list of a first memory block, a seventh memory block, and an eighth memory block.

Herein, a method for selecting the memory blocks of the candidate block list CBL will be described later in detail with reference to FIGS. 12 to 14.

Referring back to FIG. 8, for example, the controller 130 may decide whether there is a memory block corresponding to any L2P information included in the first memory mapping table NMT_1 among the listed memory blocks of the candidate block list CBL.

The channel, way, block, plane, and page information may be known from the physical address included in the first memory mapping table NMT_1.

For example, within the first memory mapping table NMT_1, the physical address 305 mapped to the logical address 0 may represent the L2P information for the memory block 5, and the physical address 900 mapped to the logical address 1 may represent the L2P information for the memory block 1. The physical address 102 mapped to the logical address 2 may represent the L2P information for the memory block 10, and the physical address 103 mapped to the logical address 3 may represent the L2P information for the memory block 11. The physical address 905 mapped to the logical address 4 may represent the L2P information for the memory block 4.

For example, within the second memory mapping table NMT_2, the physical address 10 mapped to the logical address 5 may represent the L2P information for the memory block 100. The physical address 50 mapped to the logical address 6 may represent the L2P information for the memory block 30. The physical address 203 mapped to the logical address 7 may represent the L2P information for the memory block 33. The physical address 204 mapped to the logical address 8 may represent the L2P information for the memory block 60. The physical address 205 mapped to the logical address 9 may represent the L2P information for the memory block 24.

As described above, the controller 130 may detect block information through the L2P information included in the first and second memory mapping tables NMT_1 and NMT_2, and check whether there is the block information or not in the candidate block list CBL.

In step S811, it is determined whether any piece of L2P information among the L2P information within the $N^{th}$ memory mapping table NMT_N corresponds to any memory block listed in the candidate block list CBL.

As a result, when it turns out that any piece of L2P information among the L2P information within the $N^{th}$ memory mapping table NMT_N corresponds to any memory block listed in the candidate block list CBL ("YES"), in step S813, the controller 130 may decide that the $N^{th}$ memory mapping table NMT_N is shortly to be updated due to an internal operation and may not transfer the $N^{th}$ memory mapping table NMT_N to the host 102.

For example, the controller 130 may sequentially check whether any piece of L2P information among the L2P information within the first memory mapping table NMT_1 corresponds to any memory block listed in the candidate block list CBL. For example, the logical address 1 and the physical address 900 of the first memory mapping table NMT_1 may indicate a memory block 1, and the controller 130 may check whether that piece of L2P information of the logical address 1 and the physical address 900, which represents the memory block 1, corresponds to one among the memory blocks listed in the candidate block list CBL. Since the memory block 1 is listed in the candidate block list CBL, the controller 130 may decide that the L2P information (i.e., the logical address 1 and the physical address 900 representing the memory block 1) of the first memory mapping table NMT_1 may be shortly updated as the memory block 1 is to be shortly updated due to an internal operation, and thus the controller 130 may not transfer the first memory mapping table NMT_1 to the host 102.

In step S815, the index indicating the entry information of the $N^{th}$ memory mapping table may be increased ("i=i+1"), and then the process may be performed again from the step S801.

On the other hand, as a result of decision on whether any piece of L2P information among the L2P information within the $N^{th}$ memory mapping table NMT_N corresponds to any memory block listed in the candidate block list CBL, when it is decided in step S811 that no piece of L2P information among the L2P information within the $N^{th}$ memory mapping table NMT_N corresponds to any memory block listed in the candidate block list CBL ("NO"), the data processing system may perform an operation of synchronizing the $N^{th}$ memory mapping table NMT_N included in the controller 130 and the $N^{th}$ host mapping table HMT_N included in the host 102, as described with reference to FIG. 7.

For example, the controller 130 may check whether any piece of L2P information among the L2P information within the second memory mapping table NMT_2 corresponds to any memory block listed in the candidate block list CBL. It may be seen that no piece of L2P information among the L2P information within the second memory mapping table NMT_2 corresponds to any memory block listed in the candidate block list CBL. Accordingly, the controller 130 may transfer the second memory mapping table NMT_2 to the host 102 to perform the synchronization operation.

The synchronization operation of the $N^{th}$ memory mapping table NMT_N included in the controller 130 and the $N^{th}$ host mapping table HMT_N included in the host 102 may be performed as follows.

In step S817, the controller 130 may receive a request for performing a write operation, a read operation, or a delete operation from the host 102.

In step S819, the controller 130 may provide the host 102 with entry information of the $N^{th}$ memory mapping table NMT_N along with a response to the request of the host 102 in order to inform the host 102 that the $N^{th}$ host mapping table HMT_N needs to be updated according to the updated $N^{th}$ memory mapping table NMT_N.

In step S821, the host 102 may check the entry information of the $N^{th}$ memory mapping table NMT_N provided along with the response transferred from the controller 130 and transfer a read buffer command requesting the $N^{th}$ memory mapping table NMT_N to the controller 130.

In step S823, the controller 130 may transfer the $N^{th}$ memory mapping table NMT_N to the host 102 in response to the read buffer command received from the host 102.

In step S825, the host 102 may update the $N^{th}$ host mapping table HMT_N based on the $N^{th}$ memory mapping table received from the controller 130.

Figure 13:
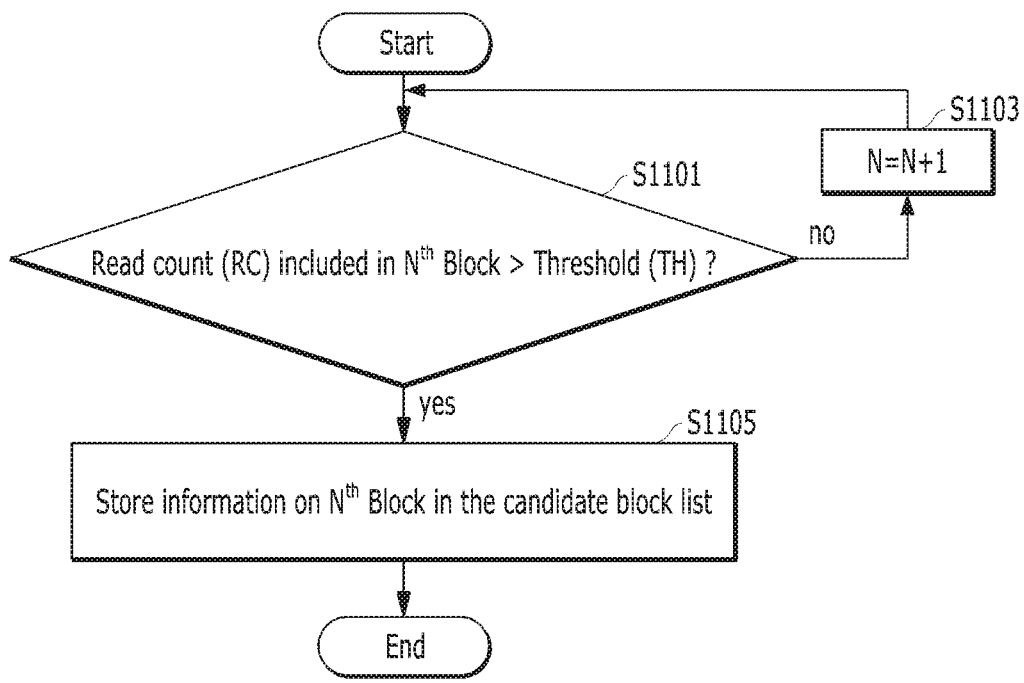
Figure 14:
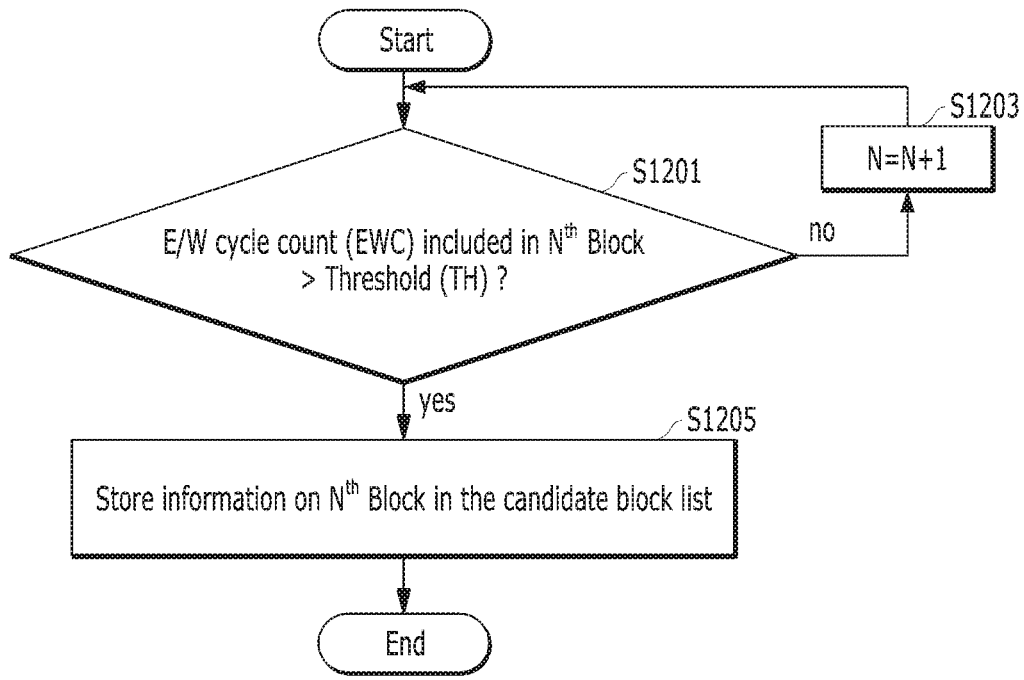

FIGS. 12 to 14 are flowcharts exemplarily describing a method for selecting memory blocks where an internal operation is to be shortly performed among a plurality of memory blocks and storing the selected memory blocks in the candidate block list CBL.

FIG. 12 is a flowchart describing a method for selecting candidate memory blocks where a garbage collection operation is to be performed among a plurality of memory blocks. In step S1001, the controller 130 may decide whether the number of the valid pages, which is simply referred to as a valid page count VPC, included in an $N^{th}$ memory block is equal to or less than a threshold value TH in order to select the candidate memory blocks where a garbage collection operation is to be performed. For example, it may be decided whether the valid page count VPC included in the first memory block is equal to or less than the threshold value.

In step S1001, when the valid page count VPC included in the first memory block is greater than the threshold value ("NO"), the controller 130 may increase the index of the $N^{th}$ memory block in step S1003 ("N=N+1"), and then the process may be performed again from the step S1001.

Meanwhile, when it turns out in the step S1001 that the valid page count VPC included in the first memory block is less than or equal to the threshold value ("YES"), the controller 130 may decide in step S1005 that the first memory block is a memory block where a garbage collection operation is to be shortly performed and list the first memory block in the candidate block list CBL.

FIG. 13 is a flowchart describing a method for selecting candidate memory blocks where a read reclaim (RRC) operation is to be performed among a plurality of memory blocks. In step S1101, the controller 130 may decide whether the number of performing a read operation, which is simply referred to as a read count RC, of the $N^{th}$ memory block is greater than a threshold TH to select the candidate memory blocks where a read reclaim operation is to be performed among all the memory blocks. For example, it is decided whether the read count RC of the first memory block is equal to or greater than the threshold value.

In step S1101, when the read count RC of the first memory block is not greater than the threshold value ("NO"), the controller 130 may increase the index of the $N^{th}$ memory block in step S1103 ("N=N+1") and the process may be performed again from the step S1101.

Meanwhile, when it turns out in the step S1101 that the read count RC of the first memory block is greater than the threshold value ("YES"), the controller 130 may decide in step S1105 that the first memory block is a memory block where a read reclaim operation is to be shortly performed, and list the first memory block in the candidate block list CBL.

FIG. 14 is a flowchart describing a method for selecting candidate memory blocks where a wear leveling operation is to be performed among a plurality of memory blocks.

In step S1201, the controller 130 may decide whether the number of E/W cycles EWC of the $N^{th}$ memory block is greater than a threshold value TH to select candidate memory blocks where a wear leveling operation is to be performed among all the memory blocks. For example, it may be decided whether the number of E/W cycles EWC of the first memory block is equal to or greater than the threshold value.

When it turns out in the step S1201 that the number of E/W cycles EWC of the first memory block is not greater than the threshold value ("NO"), the controller 130 may increase the index of the $N^{th}$ memory block in step S1203 ("N=N+1"), and the process may be performed again from the step S1201.

Meanwhile, when it turns out in the step S1201 that the number of cycles EWC of the first memory block is greater than the threshold value ("YES"), in step S1205, the controller 130 may decide that the first memory block is a memory block where a wear leveling operation is to be shortly performed and list the first memory block in the candidate block list CBL.

With reference to FIGS. 15 to 23, a data processing system and electronic appliances, to which the memory system 110 including the memory device 150 and the controller 130 described above, may be applied, in accordance with embodiments, are described.

Figure 15:
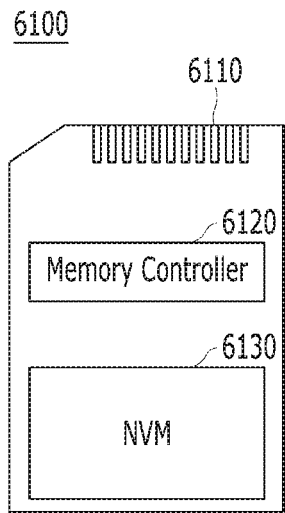
FIGS. 15 to 23 are diagrams schematically illustrating application examples of the data processing system shown in FIG. 1 in accordance with various embodiments of the present invention.

FIG. 15 is a diagram illustrating a data processing system including a memory system in accordance with an embodiment. FIG. 15 illustrates a memory card system 6100 to which the memory system is applied.

Referring to FIG. 15, the memory card system 6100 includes a connector 6110, a memory controller 6120 and a memory device 6130.

The memory controller 6120 is connected with, for access to, the memory device 6130, which is implemented as a nonvolatile memory (NVM. For example, the memory controller 6120 controls the read, write, erase and background operations of the memory device 6130. The memory controller 6120 provides an interface between the memory device 6130 and a host (not shown), and drives firmware for controlling the memory device 6130. That is to say, the memory controller 6120 may correspond to the controller 130 in the memory system 110 described above with reference to FIG. 1, and the memory device 6130 may correspond to the memory device 150 in the memory system 110 described above with reference to FIG. 1.

Therefore, the memory controller 6120 may include components such as a random access memory (RAM), a processor, a host interface, a memory interface and an error correction component.

The memory controller 6120 may communicate with an external device, for example, the host 102 described above with reference to FIG. 1, through the connector 6110. For example, as described above with reference to FIG. 1, the memory controller 6120 may be configured to communicate with the external device through at least one of various communication protocols such as universal serial bus (USB), multimedia card (MMC), embedded MMC (eMMC), peripheral component interconnection (PCI), PCI express (PCIe), advanced technology attachment (ATA), serial ATA, parallel ATA, small computer system interface (SCSI), enhanced small disk interface (ESDI), integrated drive electronics (IDE), Firewire, universal flash storage (UFS), WiFi or Wi-Fi and Bluetooth. Accordingly, the memory system and the data processing system in accordance with an embodiment may be applied to wired and/or wireless electronic appliances, particularly a mobile electronic appliance.

The memory device 6130 may be implemented by a nonvolatile memory such as an electrically erasable and programmable ROM (EPROM), a NAND flash memory, a NOR flash memory, a phase-change RAM (PRAM), a resistive RAM (ReRAM), a ferroelectric RAM (FRAM) and/or a spin torque transfer magnetic RAM (STT-MRAM).

The controller 6120 and the memory device 6130 may be integrated into one semiconductor device to form a solid state drive (SSD), or a memory card such as a PC card (e.g., personal computer memory card international association (PCMCIA)), a compact flash card (CF), a smart media card (e.g., SM and SMC), a memory stick, a multimedia card (e.g., MMC, RS-MMC, MMCmicro and eMMC), a secure digital (SD) card (e.g., SD, miniSD, microSD and SDHC) or a universal flash storage (UFS).

Figure 16:
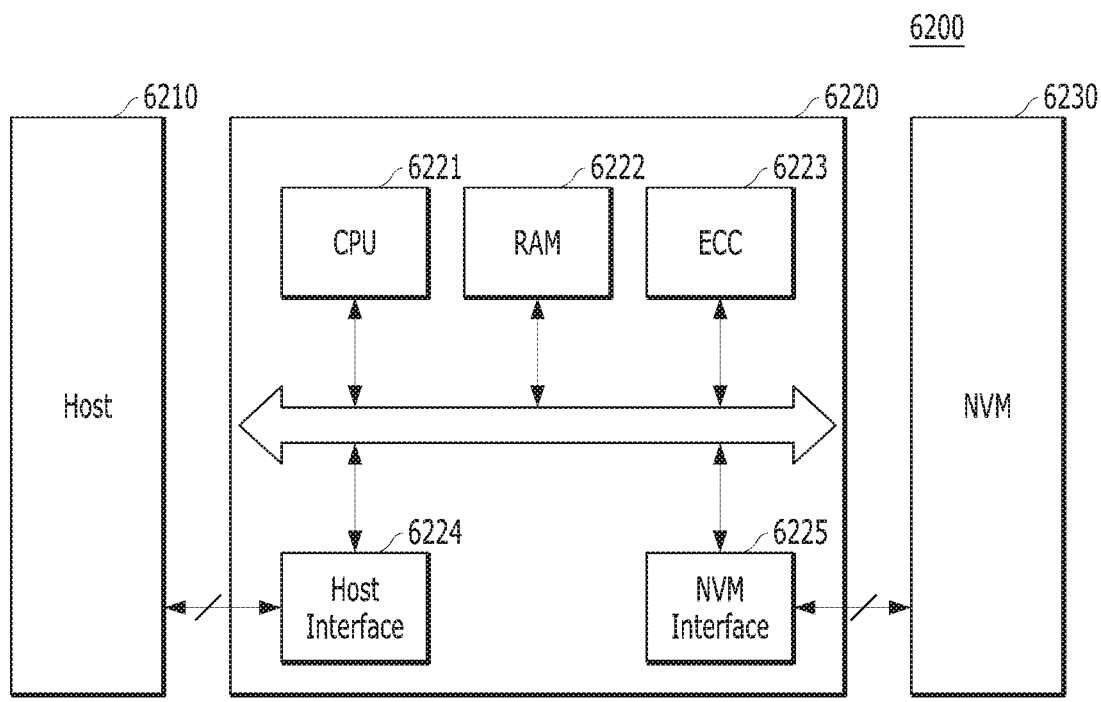

FIG. 16 is a diagram illustrating a data processing system 6200 including a memory system in accordance with an embodiment.

Referring to FIG. 16, the data processing system 6200 includes a memory device 6230 which is implemented by at least one nonvolatile memory (NVM) and a memory controller 6220 which controls the memory device 6230. The data processing system 6200 may be a storage medium such as a memory card (e.g., CF, SD and microSD). The memory device 6230 may correspond to the memory device 150 in the memory system 110 described above with reference to FIG. 1, and the memory controller 6220 may correspond to the controller 130 in the memory system 110 described above with reference to FIG. 1.

The memory controller 6220 controls read, write and erase operations for the memory device 6230 in response to requests from a host 6210. The memory controller 6220 includes at least one CPU 6221, a buffer memory, for example, a RAM 6222, an ECC circuit 6223, a host interface 6224, and a memory interface, for example, an NVM interface 6225.

The CPU 6221 may control general operations for the memory device 6230, for example, read, write, file system management, bad page management, and the like. The RAM 6222 operates according to control of the CPU 6221, and may be used as a work memory, a buffer memory, a cache memory, or the like. In the case where the RAM 6222 is used as a work memory, data processed by the CPU 6221 is temporarily stored in the RAM 6222. In the case where the RAM 6222 is used as a buffer memory, the RAM 6222 is used to buffer data to be transmitted from the host 6210 to the memory device 6230 or from the memory device 6230 to the host 6210. In the case where the RAM 6222 is used as a cache memory, the RAM 6222 may be used to enable the memory device 6230 of a low speed to operate at a high speed.

The ECC circuit 6223 corresponds to the ECC component 138 of the controller 130 described above with reference to FIG. 1. As described above with reference to FIG. 1, the ECC circuit 6223 generates an error correction code (ECC) for correcting a failed bit or an error bit in the data received from the memory device 6230. Also, the ECC circuit 6223 performs error correction encoding for data to be provided to the memory device 6230, and generates data with added parity bits. The parity bits may be stored in the memory device 6230. The ECC circuit 6223 may perform error correction decoding for data outputted from the memory device 6230. The ECC circuit 6223 may correct errors by using the parity bits. For example, as described above with reference to FIG. 1, the ECC circuit 6223 may correct errors by using various coded modulations such as an LDPC code, a BCH code, a turbo code, a Reed-Solomon code, a convolution code, an RSC, a TCM and a BCM.

The memory controller 6220 transmits and receives data to and from the host 6210 through the host interface 6224, and transmits and receives data to and from the memory device 6230 through the NVM interface 6225. The host interface 6224 may be connected with the host 6210 through a PATA bus, a SATA bus, an SCSI, a USB, a PCIe or a NAND interface. Further, as a wireless communication function or a mobile communication protocol such as WiFi or long-term evolution (LTE) is implemented, the memory controller 6220 may transmit and receive data by being connected with an external device, for example, the host 6210 or another external device other than the host 6210. Specifically, as the memory controller 6220 is configured to communicate with an external device through at least one among various communication protocols, the memory system and the data processing system in accordance with an embodiment may be applied to wired and/or wireless electronic appliances, particularly a mobile electronic appliance.

Figure 17:
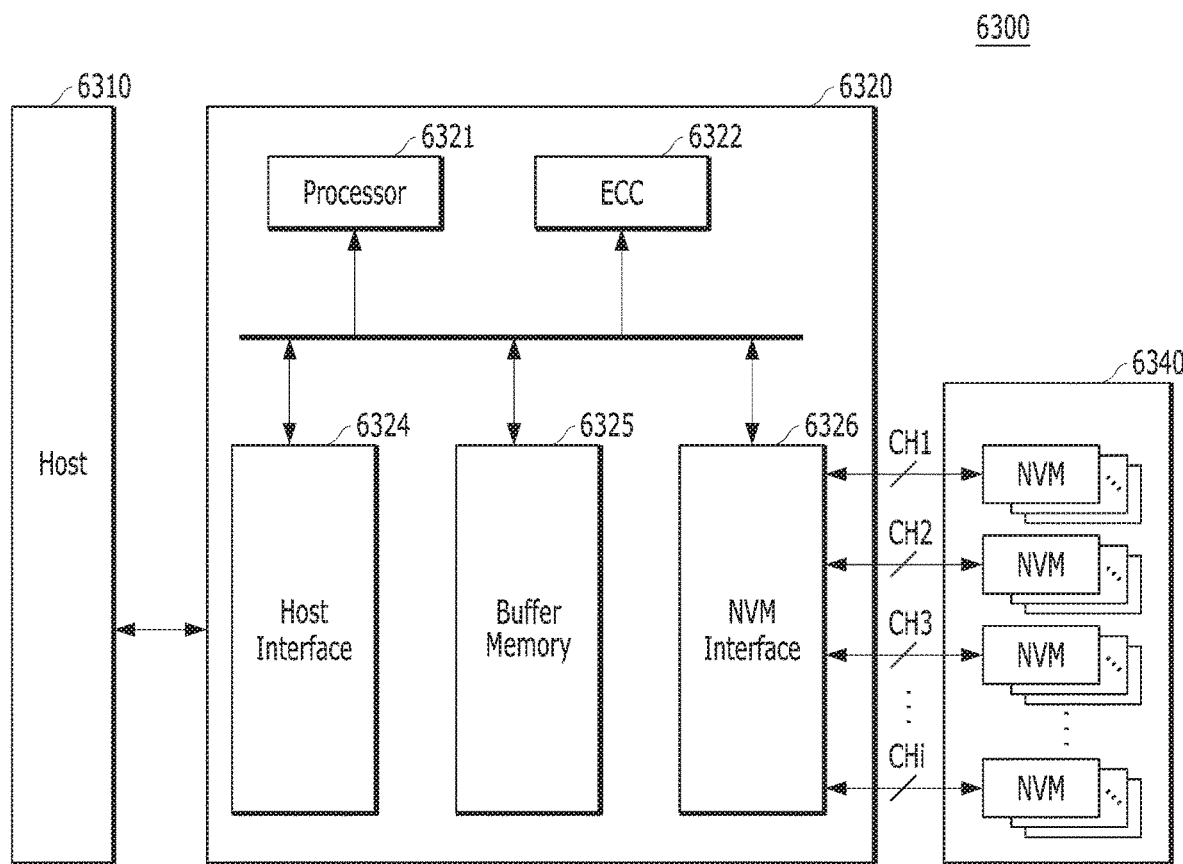

FIG. 17 is a diagram illustrating a data processing system including a memory system in accordance with an embodiment. FIG. 17 illustrates a solid state drive (SSD) 6300 to which the memory system is applied.

Referring to FIG. 17, the SSD 6300 includes a controller 6320 and a memory device 6340 which includes a plurality of nonvolatile memories (NVM). The controller 6320 may correspond to the controller 130 in the memory system 110 described above with reference to FIG. 1, and the memory device 6340 may correspond to the memory device 150 in the memory system 110 described above with reference to FIG. 1.

The controller 6320 is connected with the memory device 6340 through a plurality of channels CH1, CH2, CH3, ... and CHi. The controller 6320 includes at least one processor 6321, an ECC circuit 6322, a host interface 6324, a buffer memory 6325, and a memory interface, for example, a nonvolatile memory interface 6326.

The buffer memory 6325 temporarily stores data received from a host 6310 or data received from a plurality of flash memories NVMs included in the memory device 6340, or temporarily stores metadata of the plurality of flash memories NVMs, for example, map data including mapping tables. The buffer memory 6325 may be realized by a volatile memory such as, but not limited to, a DRAM, an SDRAM, a DDR SDRAM, an LPDDR SDRAM and a GRAM or a nonvolatile memory such as, but not limited to, an FRAM, an ReRAM, an STT-MRAM and a PRAM. While it is illustrated in FIG. 13 that the buffer memory 6325 is disposed inside the controller 6320, the buffer memory 6325 may be disposed external to the controller 6320.

The ECC circuit 6322 calculates error correction code values of data to be programmed in the memory device 6340 in a program operation. The ECC circuit 6322 performs an error correction operation for data read from the memory device 6340, based on the error correction code values, in a read operation. The ECC circuit 6322 performs an error correction operation for data recovered from the memory device 6340 in a recovery operation for failed data.

The host interface 6324 provides an interface function with respect to an external device, for example, the host 6310, and the nonvolatile memory interface 6326 provides an interface function with respect to the memory device 6340 which is connected through the plurality of channels CH1, CH2, CH3, ... and CHi.

As a plurality of SSDs 6300 to each of which the memory system 110 described above with reference to FIG. 1 is applied are used, a data processing system, for example, a redundant array of independent disks (RAID) system may be implemented. In the RAID system, the plurality of SSDs 6300 and a RAID controller for controlling the plurality of SSDs 6300 may be included. In the case of performing a program operation by receiving a write command from the host 6310, the RAID controller may select at least one memory system, that is, at least one SSD 6300, in correspondence to the RAID level information of the received write command received, among a plurality of RAID levels, that is, the plurality of SSDs 6300, and may output data corresponding to the write command to the selected SSD 6300. Also, in the case of performing a read operation by receiving a read command from the host 6310, the RAID controller may select at least one memory system, that is, at least one SSD 6300, in correspondence to the RAID level information of the received read command, among the plurality of RAID levels, that is, the plurality of SSDs 6300, and may provide data outputted from the selected SSD 6300 to the host 6310.

Figure 18:
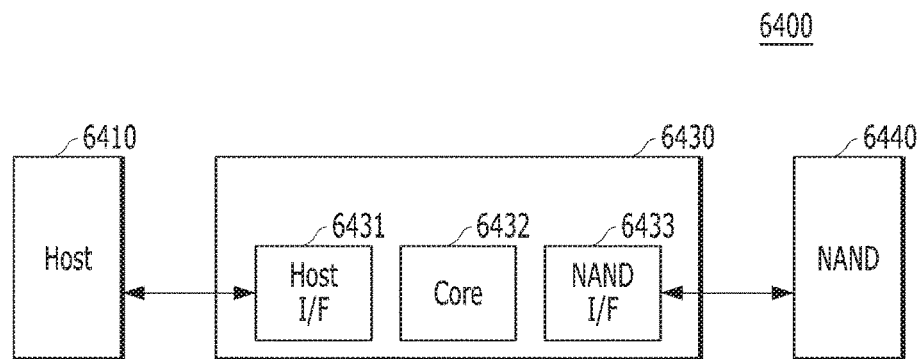

FIG. 18 is a diagram illustrating a data processing system including a memory system in accordance with an embodiment. FIG. 18 illustrates an embedded multimedia card (eMMC) 6400 to which the memory system is applied.

Referring to FIG. 18, the eMMC 6400 includes a controller 6430 and a memory device 6440 which is implemented by at least one NAND flash memory. The controller 6430 may correspond to the controller 130 in the memory system 110 described above with reference to FIG. 1, and the memory device 6440 may correspond to the memory device 150 in the memory system 110 described above with reference to FIG. 1.

The controller 6430 is connected with the memory device 6440 through a plurality of channels. The controller 6430 includes at least one core 6432, a host interface (I/F) 6431, and a memory interface, i.e., a NAND interface (I/F) 6433.

The core 6432 controls general operations of the eMMC 6400. The host interface 6431 provides an interface function between the controller 6430 and a host 6410. The NAND interface 6433 provides an interface function between the memory device 6440 and the controller 6430. For example, the host interface 6431 may be a parallel interface, for example, an MMC interface, as described above with reference to FIG. 1, and may be a serial interface, for example, an ultra high speed (UHS)-I/UHS-II and a UFS interface.

FIGS. 19 to 22 are diagrams illustrating examples of data processing systems including a memory system in accordance with embodiments. Each of FIGS. 19 to 22 illustrates a universal flash storage (UFS) to which the memory system is applied.

Referring to FIGS. 19 to 22, respective UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The respective hosts 6510, 6610, 6710 and 6810 may be wired and/or wireless electronic appliances, in particular, application processors of mobile electronic appliances or the likes. The respective UFS devices 6520, 6620, 6720 and 6820 may be embedded UFS devices. The respective UFS cards 6530, 6630, 6730 and 6830 may be external embedded UFS devices or removable UFS cards.

In the respective UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with external devices, for example, wired and/or wireless electronic appliances, in particular, mobile electronic appliances or the likes, through UFS protocols. The UFS devices 6520, 6620, 6720 and 6820 and the UFS cards 6530, 6630, 6730 and 6830 may be implemented as the memory system 110 described above with reference to FIG. 1. For example, in the respective UFS systems 6500, 6600, 6700 and 6800, the UFS devices 6520, 6620, 6720 and 6820 may be implemented in the form of the data processing system 6200, the SSD 6300 or the eMMC 6400 described above with reference to FIGS. 16 to 18, and the UFS cards 6530, 6630, 6730 and 6830 may be implemented in the form of the memory card system 6100 described above with reference to FIG. 15.

In the respective UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may perform communication through the universal flash storage (UFS) interface, for example, MIPI M-PHY and MIPI Unified Protocol (UniPro) in Mobile Industry Processor Interface (MIPI). The UFS devices 6520, 6620, 6720 and 6820 and the UFS cards 6530, 6630, 6730 and 6830 may perform communication through another protocol other than the UFS protocol, for example, various card protocols such as universal storage bus (USB) Flash Drives (UFDs), multi-media card (MMC), secure digital (SD), mini SD and Micro SD.

Figure 19:
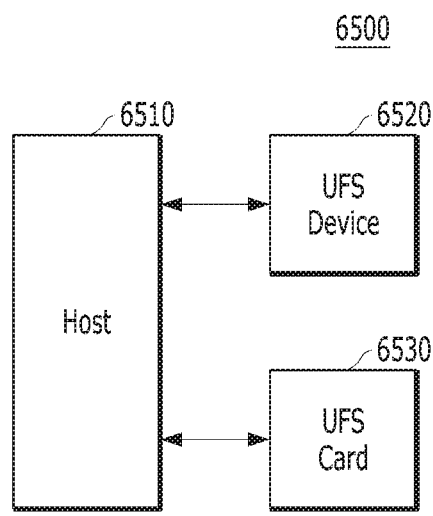
Figure 20:
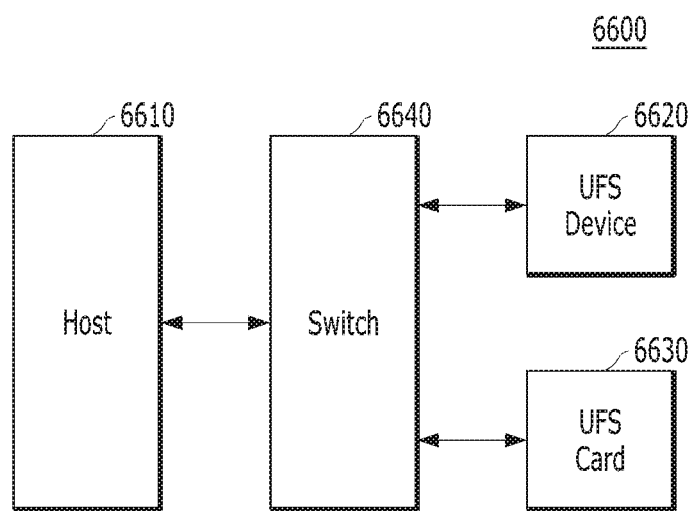

In the UFS system 6500 shown in FIG. 19, UniPro exists in each of the host 6510, the UFS device 6520 and the UFS card 6530. The host 6510 performs a switching operation to perform communication with each of the UFS device 6520 and the UFS card 6530. In particular, the host 6510 performs communication with the UFS device 6520 or the UFS card 6530, through link layer switching in UniPro, for example, L3 switching. The UFS device 6520 and the UFS card 6530 may perform communication through link layer switching in the UniPro of the host 6510. While it is described as an example that one UFS device 6520 and one UFS card 6530 are coupled to the host 6510, it is noted that a plurality of UFS devices and a plurality of UFS cards may be coupled to the host 6510 in a parallel or a star type arrangement. Also, a plurality of UFS cards may be coupled to the UFS device 6520 in any of a parallel, a star, a serial or a chain type arrangement.

In the UFS system 6600 shown in FIG. 19, UniPro exists in each of the host 6610, the UFS device 6620 and the UFS card 6630. The host 6610 performs communication with the UFS device 6620 or the UFS card 6630 through a switching module 6640 which performs a switching operation, in particular, a switching module 6640 which performs link layer switching in UniPro, for example, an L3 switching operation. The UFS device 6620 and the UFS card 6630 may perform communication through link layer switching in the UniPro of the switching module 6640. While it is described as an example that one UFS device 6620 and one UFS card 6630 are coupled to the switching module 6640, it is noted that a plurality of UFS devices and a plurality of UFS cards may be coupled to the switching module 6640 in a parallel type or a star type arrangement. Also, a plurality of UFS cards may be coupled to the UFS device 6620 in any of a parallel, a star, a serial or a chain type arrangement.

Figure 21:
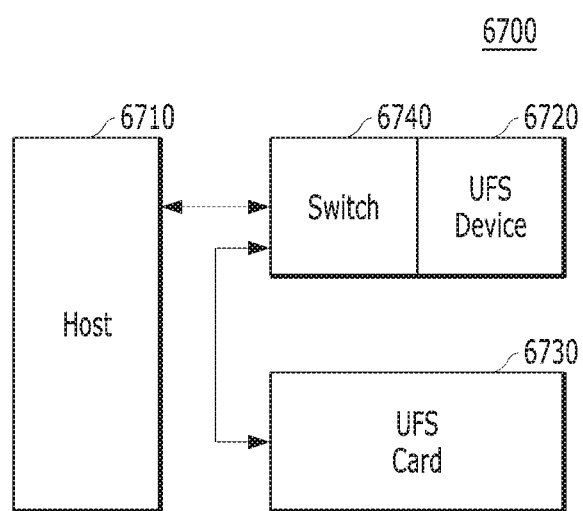

In the UFS system 6700 shown in FIG. 21, UniPro exists in each of the host 6710, the UFS device 6720 and the UFS card 6730. The host 6710 performs communication with the UFS device 6720 or the UFS card 6730 through a switching module 6740 which performs a switching operation, in particular, the switching module 6740 which performs link layer switching in UniPro, for example, an L3 switching operation. The UFS device 6720 and the UFS card 6730 may perform communication through link layer switching in the UniPro of the switching module 6740. The switching module 6740 may be implemented as one module with the UFS device 6720 inside or outside the UFS device 6720. While it is described as an example that one UFS device 6720 and one UFS card 6730 are coupled to the switching module 6740, it is noted that a plurality of modules in which the switching module 6740 and the UFS device 6720 are respectively implemented may be coupled to the host 6710 in a parallel type or a star type arrangement. Also, respective modules may be coupled in a serial type or a chain type arrangement, or a plurality of UFS cards may be coupled to the switching module 6740 in a parallel type or a star type arrangement.

Figure 22:
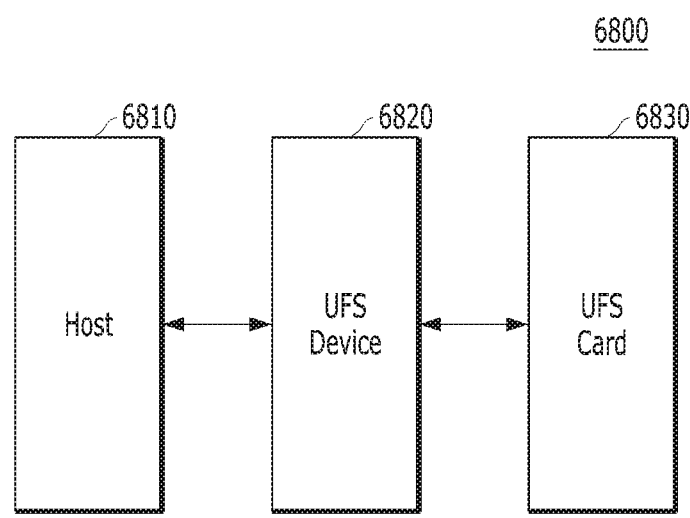

In the UFS system 6800 shown in FIG. 22, M-PHY and UniPro exist in each of the host 6810, the UFS device 6820 and the UFS card 6830. The UFS device 6820 performs a switching operation to perform communication with the host 6810 and the UFS card 6830. In particular, the UFS device 6820 performs communication with the host 6810 or the UFS card 6830, through switching between M-PHY and UniPro modules for communication with the host 6810 and M-PHY and UniPro modules for communication with the UFS card 6830, for example, target identifier (ID) switching. The host 6810 and the UFS card 6830 may perform communication through target ID switching between M-PHY and UniPro modules of the UFS device 6820. While it is described as an example that one UFS device 6820 is coupled to the host 6810 and one UFS card 6830 is coupled to one UFS device 6820, it is noted that a plurality of UFS devices may be coupled to the host 6810 in a parallel type or a star type arrangement. Also, a plurality of UFS cards may be coupled to one UFS device 6820 in any of a parallel, a star, a serial, or a chain type arrangement.

Figure 23:
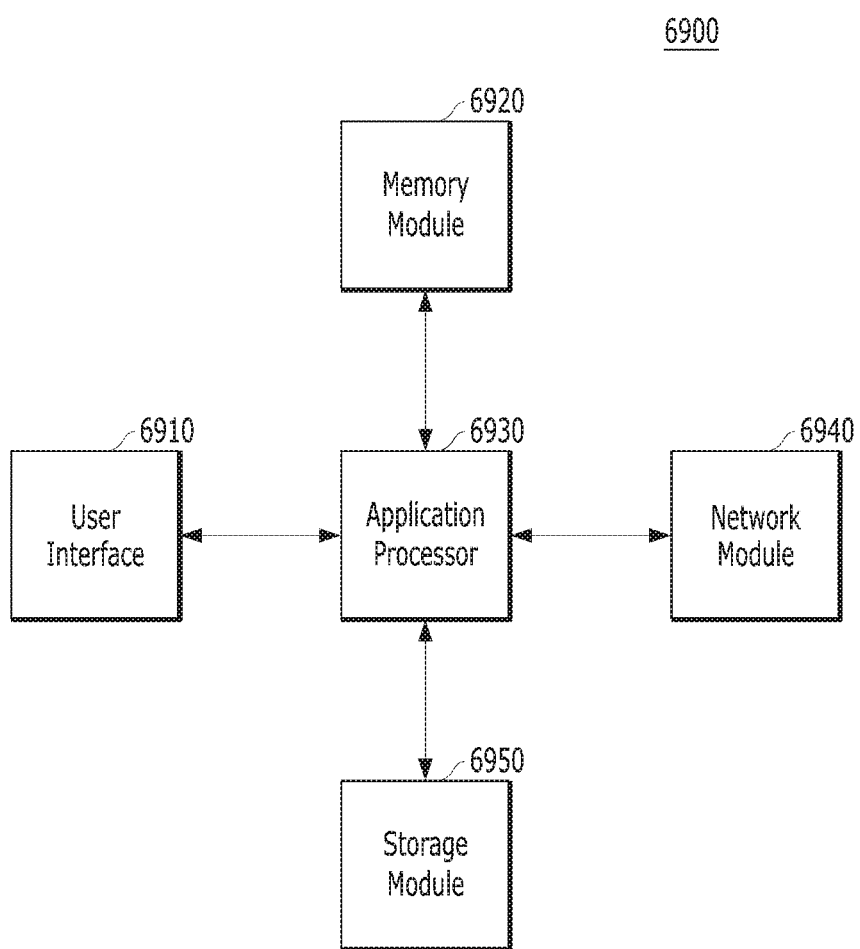

FIG. 23 is a diagram illustrating a data processing system including a memory system in accordance with an embodiment. FIG. 23 illustrates a user system 6900 to which the memory system is applied.

Referring to FIG. 23, the user system 6900 includes a user interface 6910, a memory module 6920, an application processor 6930, a network module 6940, and a storage module 6950.

The application processor 6930 drives components included in the user system 6900 and an operating system (OS). For example, the application processor 6930 may include controllers for controlling the components included in the user system 6900, interfaces, graphics engines, and so on. The application processor 6930 may be provided by a system-on-chip (SoC).

The memory module 6920 may operate as a main memory, a working memory, a buffer memory or a cache memory of the user system 6900. The memory module 6920 may include a volatile random access memory such as a DRAM, an SDRAM, a DDR SDRAM, a DDR2 SDRAM, a DDR3 SDRAM, an LPDDR SDRAM, an LPDDR2 SDRAM and an LPDDR3 SDRAM or a nonvolatile random access memory such as a PRAM, an ReRAM, an MRAM and an FRAM. For example, the application processor 6930 and the memory module 6920 may be mounted by being packaged on the basis of a package-on-package (PoP).

The network module 6940 may communicate with external devices. For example, the network module 6940 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), and the like, and may thereby communicate with wired and/or wireless electronic appliances, particularly a mobile electronic appliance. According to this fact, the memory system and the data processing system may be applied to wired and/or wireless electronic appliances. The network module 6940 may be included in the application processor 6930.

The storage module 6950 may store data, for example, data received from the application processor 6930, and transmit data stored therein, to the application processor 6930. The storage module 6950 may be implemented by a nonvolatile memory such as a phase-change RAM (PRAM), a magnetic RAM (MRAM), a resistive RAM (ReRAM), a NAND flash memory, a NOR flash memory and a 3-dimensional NAND flash memory. Also, the storage module 6900 may be provided as a removable storage medium such as a memory card of the user system 6900 and an external drive. That is to say, the storage module 6950 may correspond to the memory system 110 described above with reference to FIG. 1, and may be implemented as the SSD, eMMC and UFS described above with reference to FIGS. 17 to 19.

The user interface 6910 may include interfaces for inputting data or commands to the application processor 6930 or for outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

In the case where the memory system 110 described above with reference to FIG. 1 is applied to the mobile electronic appliance of the user system 6900 in accordance with an embodiment, the application processor 6930 controls general operations of the mobile electronic appliance, and the network module 6940 as a communication module controls wired and/or wireless communication with an external device, as described above. The user interface 6910 as the display and touch module of the mobile electronic appliance displays data processed by the application processor 6930 or supports input of data from a touch panel.

According to the embodiments of the present invention, a data processing system and a method for operating the data processing system may have minimized complexity and performance deterioration by efficiently synchronizing a memory mapping table included in a memory device with a host mapping table included in a host.

While the present invention has been described with respect to the specific embodiments, it will be apparent to those skilled in the art that various changes and modifications may be made without departing from the spirit and scope of the invention as defined in the following claims.

What is claimed is:

1. A method for operating a data processing system provided with a host including a first memory, a memory device, and a controller including a second memory, the method comprising:
   checking, by the controller, whether a first mapping table whose mapping information is changed exists or not in a memory mapping table change list and then checking, by the controller, whether the first mapping table exists or not in the second memory;
   checking, by the controller, whether a memory block corresponding to a piece of map data included in the first mapping table exists or not in a candidate block list, when the first mapping table exists in the second memory;
   deciding, by the controller, that the first mapping table is to be updated due to an internal operation and returning to the checking, when the memory block corresponding to the map data exists in the candidate block list;
   transferring, by the controller, the first mapping table to the host, when any memory block corresponding to any piece of map data does not exist in the candidate block list; and
   receiving, by the host, the first mapping table from the controller and updating, by the host, a second mapping table included in the first memory and corresponding to the first mapping table,
   wherein the memory mapping table change list includes the entry information for a mapping table including changed map data due to a command operation or an internal operation,
   wherein the candidate block list includes information for the memory blocks for which an internal operation is to be performed among a plurality of blocks, and
   wherein the internal operation may be any one among a garbage collection operation, a read reclaim operation and a wear leveling operation.

2. The method of claim 1, wherein the receiving and updating includes:
   providing, by the controller, entry information of the first mapping table along with a response to the host;
   transferring, by the host, a read buffer command requesting the controller for the first mapping table;
   transferring, by the controller, the first mapping table to the host; and
   updating, by the host, the second mapping table based on the first mapping.

3. The method of claim 1, further comprising loading, by the memory device, the first mapping table onto the second memory when the first mapping table does not exist in the second memory.

4. The method of claim 1, wherein the entry information for the mapping table includes one among a mapping table number, type information of the map data, and size information of the map data and the like.

5. The method of claim 1, further comprising: selecting, by the controller, memory blocks in which an internal operation including a garbage collection operation, a read re-claim operation or a wear leveling operation is to be performed among a plurality of memory blocks and including, by the controller, the selected memory blocks in the candidate block list.

6. The method of claim 5, wherein the selecting and including includes deciding whether a valid page count a memory block is equal to or less than a threshold value, and including the memory block, whose valid page count is equal to or less than the threshold value, in the candidate block list.

7. The method of claim 5, wherein the selecting and including includes deciding whether a read count of a memory block is equal to or greater than a threshold value, and including the memory block, whose read count is equal to or greater than the threshold value, in the candidate block list.

8. The method of claim 5, wherein the selecting and including includes deciding whether an erase/write cycle count of a memory block is equal to or greater than a threshold value, and including the memory block, whose erase/write cycle count is equal to or greater than the threshold value, in the candidate block list.

9. A data processing system, comprising:
a host that includes a first memory; and
a memory system that includes a controller having a second memory, and a memory device,
wherein the controller:
checks whether a first mapping table whose mapping information is changed exists or not in a memory mapping table change list,
checks whether a memory block corresponding to a piece of map data included in the first mapping table exists or not in a candidate block list, and
decides that the first mapping table is to be updated due to an internal operation and does not transfer the first mapping table to the host when the memory block corresponding to the map data included in the first mapping table exists in the candidate block list,
wherein the memory mapping table change list includes the entry information for a mapping table including changed map data due to a command operation or an internal operation,
wherein the candidate block list includes information for the memory blocks for which an internal operation is to be performed among a plurality of blocks, and
wherein the internal operation may be any one among a garbage collection operation, a read reclaim operation and a wear leveling operation.

10. The data processing system of claim 9, wherein the controller further transfers the first mapping table to the host, when the memory block corresponding to the map data does not exist in the candidate block list.

11. The data processing system of claim 10, wherein the host updates a second mapping table included in the first memory and corresponding to the first mapping table based on the first mapping table transferred from the controller.

12. The data processing system of claim 9,
wherein the controller checks, before the checking of whether a memory block corresponding to the map data included in the first mapping table exists or not in the candidate block list, whether the first mapping table exists or not in the second memory, and
wherein the memory device loads, when the first mapping table does not exist in the second memory, the first mapping table onto the second memory.

13. The data processing system of claim 9,
wherein the entry information for the mapping table includes one among a mapping table number, type information of the map data, and size information of the map data and the like.

14. The data processing system of claim 9, wherein the controller further selects memory blocks in which an internal operation including a garbage collection operation, a read re-claim operation or a wear leveling operation is to be performed among a plurality of memory blocks and includes the selected memory blocks in the candidate block list.

15. The data processing system of claim 14, wherein the controller performs the selecting and including by deciding whether a valid page count a memory block is equal to or less than a threshold value, and including the memory block, whose valid page count is equal to or less than the threshold value, in the candidate block list.

16. The data processing system of claim 14, wherein the controller performs the selecting and including by deciding whether a read count of a memory block is equal to or greater than a threshold value, and including the memory block, whose read count is equal to or greater than the threshold value, in the candidate block list.

17. The data processing system of claim 14, wherein the controller performs the selecting and including by deciding whether an erase/write cycle count of a memory block is equal to or greater than a threshold value, and including the memory block, whose erase/write cycle count is equal to or greater than the threshold value, in the candidate block list.

18. A memory system comprising:
at least one processor; and
at least one memory device including a program command,
wherein the program command configured to cause the memory system to:
check whether a first mapping table whose mapping information is changed exists or not in a memory mapping table change list;
check whether the first mapping table exists or not in a second memory when the first mapping table whose mapping information is changed exists in the memory mapping table change list;
check, when the first mapping table exists in the second memory, whether a memory block corresponding to a piece of map data included in the first mapping table exists or not in a candidate block list;
decide, when a memory block corresponding to the at least one map data included in the first mapping table exists in the candidate block list, that the first mapping table is to be updated due to an internal operation and does not transfer the first mapping table to the host; and
when a memory block corresponding to the at least one map data included in the first mapping table does not exist in the candidate block list, provide entry information of the first mapping table along with a response to a host, and transfer the first mapping table to the host in response to a read buffer command requesting the first mapping table from the host;
wherein the memory mapping table change list includes the entry information for a mapping table including changed map data due to a command operation or an internal operation, wherein the candidate block list includes information for the memory blocks for which an internal operation is to be performed among a plurality of blocks, and wherein the internal operation may be any one among a garbage collection operation, a read reclaim operation and a wear leveling operation.

19. The memory system of claim 18, the program command is further configured to cause the memory system to load the first mapping table onto the second memory when the first mapping table does not exist in the second memory.

20. An operating method of a controller, the method comprising:

updating a first mapping table, which includes plural pieces of map information, due to an operation of a memory device controlled by the controller; and providing an external device, which keeps a second mapping table, with the updated first mapping table for synchronization between the first and second mapping table unless the updated first mapping table is to be updated again, wherein the map information represents mapping relationship between a virtual memory address known to the external device and a substantial memory address of the memory device.

* * * * *